United States Patent

(12) United States Patent
Stover et al.

(10) Patent No.: US 11,391,875 B2
(45) Date of Patent: Jul. 19, 2022

(54) DISPLAY LAMINATE WITH SINGLE PACKET BIAXIALLY BIREFRINGENT REFLECTIVE POLARIZER

(71) Applicant: 3M INNOVATIVE PROPERTIES COMPANY, St. Paul, MN (US)

(72) Inventors: Carl A. Stover, St. Paul, MN (US); Kristopher J. Derks, Woodbury, MN (US); Timothy J. Nevitt, Red Wing, MN (US); Gilles J. Benoit, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 90 days.

(21) Appl. No.: 17/089,417

(22) Filed: Nov. 4, 2020

(65) Prior Publication Data

US 2021/0048571 A1 Feb. 18, 2021

Related U.S. Application Data

(63) Continuation of application No. 16/745,427, filed on Jan. 17, 2020, now Pat. No. 10,859,741, which is a (Continued)

(51) Int. Cl.
*G02B 5/30* (2006.01)
*B29D 11/00* (2006.01)
(Continued)

(52) U.S. Cl.
CPC ........ *G02B 5/3041* (2013.01); *B29D 11/0073* (2013.01); *B29D 11/00644* (2013.01);
(Continued)

(58) Field of Classification Search
CPC .. G02B 5/3033; G02B 5/3041; G02B 5/3083; G02B 27/28; G02F 1/133536; B29D 11/00644

(Continued)

(56) References Cited

U.S. PATENT DOCUMENTS 5,808,794 A  9/1998 Weber
5,882,774 A  3/1999 Jonza
(Continued)

FOREIGN PATENT DOCUMENTS

JP  2003-177401  6/2003
JP  2004-354678  12/2004
(Continued)

OTHER PUBLICATIONS

International Search Report for PCT International Application No. PCT/US2016/062237, dated Feb. 23, 2017, 3 pages.

*Primary Examiner* — Ricky D Shafer
(74) *Attorney, Agent, or Firm* — Robert S. Moshrefzadeh

(57) ABSTRACT

Multilayer optical film reflective polarizers previously considered to have excessive off-axis color can provide adequate performance in an LC display without any high haze light diffusing layer or air gap between the reflective polarizer and the back absorbing polarizer of the display. The reflective polarizer has only one packet of microlayers, and is oriented using a standard tenter such that birefringent microlayers in the film are biaxially birefringent. The microlayers in the packet have a layer thickness profile suitably tailored to avoid excessive perceived color at normal and oblique angles. A laminate made by combining this type of reflective polarizer with an absorbing polarizer, without an air gap or any high haze light diffusing layer or structure between the polarizers, can be used and incorporated into a liquid crystal display or the like with adequate color performance both at normal incidence and oblique incidence up to a polar angle of 60 degrees.

15 Claims, 11 Drawing Sheets

Related U.S. Application Data continuation of application No. 15/776,699, filed as application No. PCT/US2016/062237 on Nov. 16, 2016, now Pat. No. 10,545,273.

(60) Provisional application No. 62/255,599, filed on Nov. 16, 2015.

(51) Int. Cl.
  *G02B 27/28* (2006.01)
  *B32B 17/10* (2006.01)
  *G02F 1/1335* (2006.01)
  *G02F 1/13357* (2006.01)
  *B29L 31/34* (2006.01)

(52) U.S. Cl.
  CPC ............ *B32B 17/10* (2013.01); *G02B 5/3083* (2013.01); *G02B 27/28* (2013.01); *G02F 1/133536* (2013.01); *B29L 2031/3475* (2013.01); *B32B 2307/42* (2013.01); *B32B 2457/202* (2013.01); *G02B 5/3033* (2013.01); *G02F 1/13362* (2013.01); *G02F 1/133606* (2013.01)

(58) Field of Classification Search
  USPC ............ 359/485.03, 485.04, 489.11, 489.13; 349/96
  See application file for complete search history.

(56) References Cited

U.S. PATENT DOCUMENTS

| | | |
|---|---|---|
| 6,025,897 A | 2/2000 | Weber |
| 6,088,163 A | 7/2000 | Gilbert et al. |
| 6,124,905 A | 9/2000 | Iijima |
| 6,543,153 B1 | 4/2003 | Weber |
| 6,565,982 B1 | 5/2003 | Ouderkirk et al. |
| 6,783,349 B2 | 8/2004 | Neavin |
| 6,927,900 B2 | 8/2005 | Liu et al. |
| 6,949,212 B2 | 9/2005 | Merrill |
| 8,469,575 B2 | 6/2013 | Weber |
| 9,057,843 B2 | 6/2015 | Weber et al. |
| 9,188,790 B2 | 11/2015 | Weber et al. |
| 9,488,766 B2 | 11/2016 | Weber et al. |
| 10,545,273 B2 | 1/2020 | Stover et al. |
| 10,754,073 B2 | 8/2020 | Benoit et al. |
| 10,859,741 B2 * | 12/2020 | Stover .................. G02B 5/3083 |
| 2008/0151147 A1 | 6/2008 | Weber |
| 2008/0151371 A1 | 6/2008 | Weber |
| 2011/0102891 A1 | 5/2011 | Derks |
| 2011/0272849 A1 | 11/2011 | Neavin |
| 2012/0206674 A1 | 8/2012 | Weber et al. |
| 2013/0063818 A1 | 3/2013 | Weber |
| 2015/0146294 A1 | 5/2015 | Watanabe |
| 2015/0226999 A1 | 8/2015 | Fuchida et al. |

FOREIGN PATENT DOCUMENTS

| | | |
|---|---|---|
| WO | WO 2006-044075 | 4/2006 |
| WO | WO 2015-034899 | 3/2015 |

\* cited by examiner

DISPLAY LAMINATE WITH SINGLE PACKET BIAXIALLY BIREFRINGENT REFLECTIVE POLARIZER

FIELD OF THE INVENTION

This invention relates generally to reflective polarizing films, with particular application to such films that form a laminate with at least an absorbing polarizer. The invention also relates to associated articles, systems, and methods.

BACKGROUND

Reflective polarizers are commonly used to enhance the brightness of liquid crystal (LC) displays and display systems. The LC display system typically includes an LC panel, behind which is an illumination assembly or backlight positioned to provide light to the LC panel. Brightness enhancement is provided by the reflective polarizer as the result of a light recycling process: light that cannot (because of its polarization state) contribute to the display output is reflected by the reflective polarizer back into the backlight, where some of the light is re-reflected towards the reflective polarizer in a different polarization state that can contribute to the display output and that passes through the reflective polarizer toward the user or viewer.

The LC panel includes a layer of liquid crystal material disposed between glass panel plates. Furthermore, the LC panel is sandwiched between two absorbing polarizer films: a front absorbing polarizer, attached to the front glass plate of the LC panel, and a back absorbing polarizer, attached to the back glass plate. The brightness-enhancing reflective polarizer is placed somewhere behind the LC panel, and behind the back absorbing polarizer.

In practice, design details of the reflective polarizer have an impact on exactly where the reflective polarizer can be placed in the display system to provide optimal, or at least acceptable, optical performance. Some types of reflective polarizers can be laminated directly to the exposed rear surface of the back absorbing polarizer. Those of ordinary skill in the art consider it necessary for these types of reflective polarizers to have a very low perceived color for the pass state of polarization both at normal incidence (light propagating along the optical axis of the display system) and at highly oblique incidence. Since the reflective polarizer is attached to the back absorbing polarizer, and the back absorbing polarizer is in turn commonly attached to the back glass plate of the LC panel, this is referred to as an "on-glass" configuration of the reflective polarizer. One reflective polarizer currently used in the on-glass configuration is a parabolically-stretched reflective polarizer, discussed further below. Another reflective polarizer used in the on-glass configuration is a multi-packet reflective polarizer, also discussed below.

Other types of reflective polarizers, considered by those of ordinary skill in the art to have excessive perceived color for the pass state of polarization for obliquely incident light, are not laminated to the back absorbing polarizer of the display because the (undesirable) color associated with the reflective polarizer would be visible to the user through the absorbing polarizer and through the LC display. Instead, these latter types of reflective polarizers are used in the display system as a stand-alone film, separated from the back absorbing polarizer by at least one air gap, and attached to a light diffusing film or layer that is disposed between the reflective polarizer and the back absorbing polarizer. The light diffusing layer has a significant haze value so as to effectively combine light rays that pass through the reflective polarizer in different directions, to reduce or eliminate the color associated with the reflective polarizer from the standpoint of the user or viewer.

BRIEF SUMMARY

Broadly speaking, the stand-alone and on-glass configurations have certain practical advantages and disadvantages relative to each other. One advantage of the stand-alone reflective polarizer, separated as it is from the back absorbing polarizer and from the LC panel by an air gap, is that the reflective polarizer is mechanically decoupled from the LC panel, thus reducing or eliminating mechanical interactions between the reflective polarizer and the LC panel. These interactions may include, for example: panel-induced bending or wrinkling of the reflective polarizer at elevated environmental test conditions; and lamination defects, or defects in the reflective polarizer film, which may require rework of the LC panel. A disadvantage of the on-glass configuration is the relatively high cost of the reflective polarizer, which in some cases is due to the low yield of parabolically-stretched reflective polarizers (discussed below), and in other cases is due to the high material cost of multiple packet reflective polarizer products (also discussed below). However, a benefit of the on-glass configuration is the simplicity and convenience of having a single polarizer product that includes both the back absorbing polarizer and the reflective polarizer in one laminate film product.

We have found that certain multilayer optical film reflective polarizers previously considered to have too much off-axis color to be used in an on-glass configuration—hence, previously considered to be limited in a display system to a stand-alone configuration with an attached high haze light diffusing layer and spaced apart from the back absorbing polarizer by an air gap to reduce unwanted color effects—can actually provide acceptable performance in an LC display without the need for any such air gap or high haze light diffusing layer. Thus, a laminate made by combining such a reflective polarizer with an absorbing polarizer, without an air gap and without a high haze light diffusing layer or structure (and in some cases without any significant light diffusing layer or structure) between the reflective polarizer and the absorbing polarizer, can be successfully used and incorporated into a liquid crystal display or the like. The reflective polarizer in this construction is a multilayer optical film of alternating polymer layers in which there is only one packet of microlayers, the multilayer optical film having been oriented using a standard tenter such that birefringent layers of the film are biaxially birefringent. The microlayers in the packet are provided with a layer thickness profile appropriately tailored to avoid excessive perceived color at normal and oblique angles. Such multilayer optical film reflective polarizers are discussed further below.

We thus describe herein, inter alia, optical film laminates that include a reflective polarizer and an absorbing polarizer. The reflective polarizer has only one packet of microlayers that reflects and transmits light by optical interference, the microlayers configured to define a first pass axis, a first block axis, and a first thickness axis perpendicular to the first pass axis and the first block axis. The absorbing polarizer has a second pass axis and a second block axis, and is attached to the reflective polarizer with no air gap therebetween, the first and second pass axes being substantially aligned. The packet of microlayers includes alternating first and second microlayers, and at least the first microlayers are biaxially birefringent. The reflective polarizer in isolation is characterized by a spectral transmission, for p-polarized light incident at a polar angle of 60 degrees in a reference plane that includes the first pass axis and the first thickness axis, in which (a) the spectral transmission has a value in a range from 70% to 90%, or from 70% to 85%, for at least some wavelengths from 450 to 700 nm; and (b) a high frequency spectral variability Δ (Greek letter delta), over a wavelength range from 400 to 700 nm, is less than 0.08, or less than 0.05.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Figure 1:
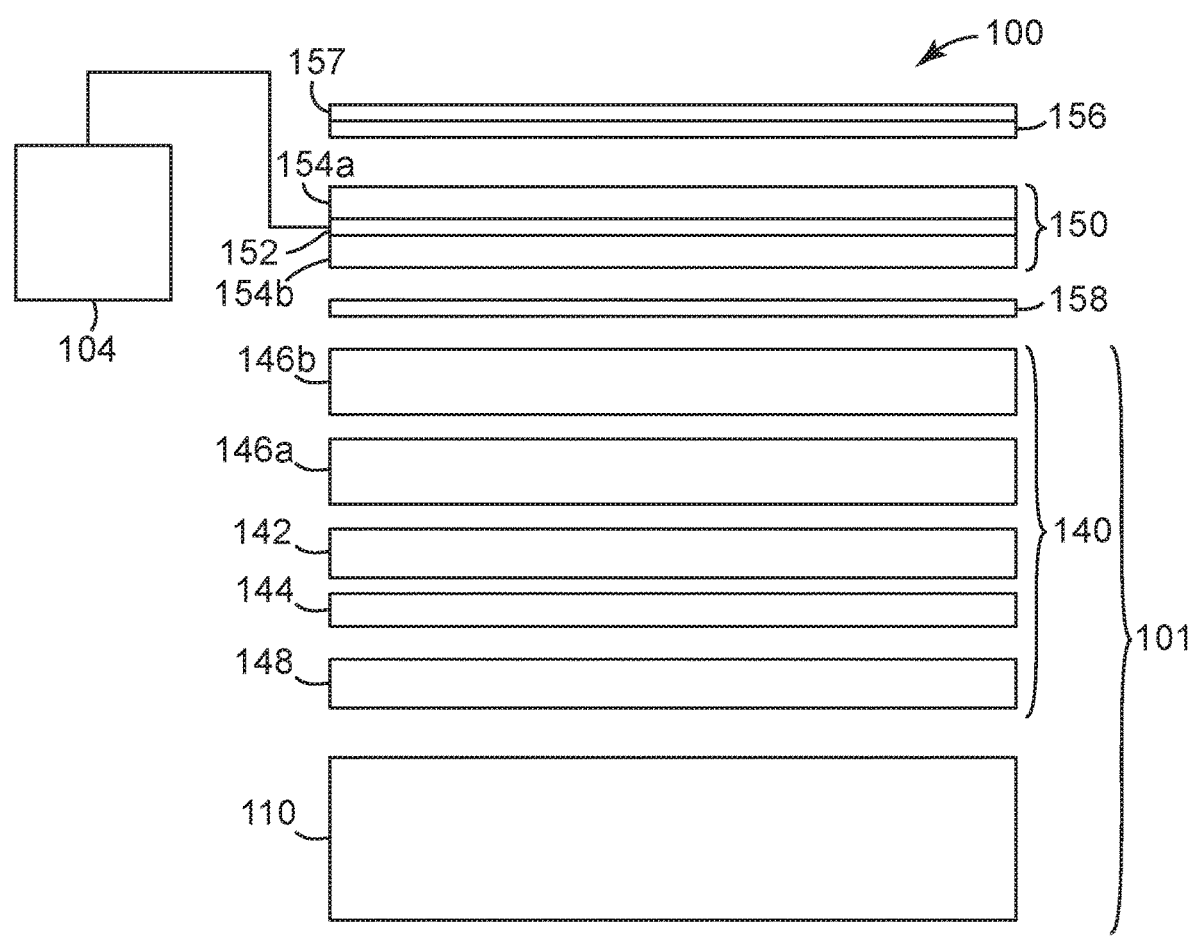
FIG. 1 is a schematic side or sectional view of a liquid crystal display system.

As mentioned above, we have found that certain types of multilayer optical film reflective polarizers previously considered to have excessive off-axis color can actually provide adequate performance in a liquid crystal display without the need for any air gap or high haze light diffusing layer (and in some cases with no light diffusing layer or structure at all) between the reflective polarizer and the back absorbing polarizer of the LC display. The type of reflective polarizer at issue has only one packet of microlayers, and is oriented using a standard tenter such that birefringent microlayers in the film are biaxially birefringent. Furthermore, the microlayers in the single packet have a suitably tailored layer thickness profile. Previously, it was believed this type of reflective polarizer needed to have a high haze light diffusing layer, and needed to be separated from the rear absorbing polarizer by an air gap, to avoid unwanted color effects from the standpoint of the user or viewer of the display. We have found that a laminate made by combining this type of reflective polarizer with an absorbing polarizer, without an air gap or any high haze light diffusing layer or structure between the polarizers, can be used and incorporated into a liquid crystal display or the like with adequate color performance both at normal incidence and oblique incidence, up to a polar angle of at least 60 degrees.

In general, if one is given a multilayer optical film reflective polarizer of unspecified design, appropriate placement of that reflective polarizer in an LC display system is a function of, among other things, color characteristics of the reflective polarizer, particularly color characteristics at high off-axis (oblique) angles of light propagation. Such color characteristics are, in turn, a function of the manner in which the film was fabricated, and the film's resulting physical and optical features.

For example, it is known to fabricate a reflective polarizer by coextruding tens, hundreds, or thousands of alternating polymer layers through a die, optionally doubling or tripling the number of layers by splitting and re-stacking the flow stream in a layer multiplier device, cooling the extrudate on a casting wheel, and orienting (stretching) the cast film to reduce the film thickness such that individual polymer layers form optically thin microlayers, and to induce birefringence in at least some of the microlayers. In the finished multilayer optical film, the microlayers reflect and transmit light by optical interference, as a function of refractive index differences between adjacent microlayers, optical thicknesses of adjacent pairs of microlayers, and the thickness profile of a stack of such layer pairs along a thickness direction or axis of the film. To make a reflective polarizer, the orientation or stretching is carried out primarily along one in-plane direction, so that the refractive indices of the microlayers define a block axis of high reflectivity, a pass axis of low reflectivity (and high transmission), and a thickness axis perpendicular to the pass and block axes. See for example U.S. Pat. No. 5,882,774 (Jonza et al.).

FIG. 1 is provided for reference to illustrate various components, layers, and films that may be included in a typical LC display system 100. The display system 100 includes a display panel 150 and an illumination assembly 101 positioned behind the panel 150 to provide light thereto. The display panel 150 can include any suitable type of display. In the illustrated embodiment, the display panel 150 includes, or is, an LC panel (hereafter referred to as LC panel 150). The LC panel 150 typically includes a layer of liquid crystal (LC) 152 disposed between panel plates 154a, 154b (collectively, 154). The plates 154 are often composed of glass and can include electrode structures and alignment layers on their inner surfaces for controlling the orientation of the liquid crystals in the LC layer 152. These electrode structures are commonly arranged so as to define LC panel pixels, i.e., areas of the LC layer where the orientation of the liquid crystals can be controlled independently of adjacent areas. A color filter may also be included with one or more of the plates 152 for imposing desired colors such as red, green, and blue on subpixel elements of the LC layer, and thus on the image displayed by the LC panel 150.

The LC panel 150 is positioned between a front (or upper) absorbing polarizer 156 and a back (or lower) absorbing polarizer 158. In the illustrated embodiment, the front and back absorbing polarizers 156, 158 are located outside the LC panel 150. Often, the absorbing polarizer (156 or 158) is laminated to the outer major surface of its neighboring glass panel plate (154a or 154b respectively) with a suitable transparent adhesive. The absorbing polarizers 156, 158 and the LC panel 150 in combination control the transmission of light from a backlight 110 through the display system 100 to the viewer. For example, the absorbing polarizers 156, 158 may be arranged with their pass axes (transmission axes) perpendicular to each other. Selective activation of different pixels of the LC layer 152, e.g. by a controller 104, results in light passing out of the display system 100 at certain desired locations, thus forming an image seen by the viewer. The controller 104 may include, for example, a computer or a television controller that receives and displays television images.

One or more optional layers 157 may be provided proximate the front absorbing polarizer 156, for example, to provide mechanical and/or environmental protection to the display surface. The layer 157 may for example include a hardcoat over the front absorbing polarizer 156.

The illumination assembly 101 includes a backlight 110 and one or more light management films in an arrangement 140 positioned between the backlight 110 and the LC panel 150. The backlight 110 can be or include any known backlight of suitable design. For example, light source(s) within the backlight may be positioned such that the backlight is of the edge-lit variety or the direct-lit variety.

The arrangement 140 of light management films, which may also be referred to as a light management unit, is positioned between the backlight 110 and the LC panel 150. The light management films affect the illumination light propagating from the backlight 110. In some cases the backlight 110 can be considered to include one, some, or all of the light management films in the arrangement 140.

The arrangement 140 of light management films may include a diffuser 148. The diffuser 148 is used to scatter or diffuse the light received from the backlight 110. The diffuser 148 may be any suitable diffuser film or plate. For example, the diffuser 148 can include any suitable diffusing material or materials. In some embodiments, the diffuser 148 may include a polymeric matrix of polymethyl methacrylate (PMMA) with a variety of dispersed phases that include glass, polystyrene beads, and $CaCO_3$ particles. The diffuser 148 may also be or include 3M™ Scotchcal™ Diffuser Film, types 3635-30, 3635-70, and 3635-100, available from 3M Company, St. Paul, Minn., USA. A diffuser 148 as used in a light management film arrangement such as arrangement 140 would typically have a relatively high haze, e.g. at least 40%, as measured using a Haze Guard Plus haze meter from BYK-Gardiner, Silver Springs, Md., according to a suitable procedure such as that described in ASTM D1003.

The light management unit 140 also includes a reflective polarizer 142. Although in a general sense the reflective polarizer 142 may be of any suitable design—for example, a multilayer optical film, a diffusely reflective polarizing film (DRPF) such as a continuous/disperse phase polarizer, a wire grid reflective polarizer, or a cholesteric reflective polarizer—for purposes of the present application we are interested in cases where the reflective polarizer is a particular type of multilayer optical film, as discussed elsewhere herein. For example, the reflective polarizer may be a multilayer optical film of alternating polymer layers in which there is only one packet of microlayers, the multilayer optical film having been oriented using a standard tenter such that birefringent layers (including birefringent microlayers) of the film are biaxially birefringent. Those of ordinary skill in the art have regarded this type of reflective polarizer as having so much off-axis color that a high haze diffuser and air gap between the reflective polarizer 142 and the back absorbing polarizer 158 was considered necessary to keep the overall perceived color of the display system 100 at or reasonably near a neutral white color.

In some embodiments, a polarization control layer 144, such as a quarter wave retarding layer, may be provided between the diffuser 148 and the reflective polarizer 142. The polarization control layer 144 may be used to change the polarization of light that is reflected from the reflective polarizer 142 so that an increased fraction of the recycled light is transmitted through the reflective polarizer 142.

The arrangement 140 of light management films may also include one or more brightness enhancing layers. A brightness enhancing layer can redirect off-axis light in a direction closer to the axis of the display. This increases the amount of light propagating on-axis through the LC layer 152, thus increasing the brightness of the image seen by the viewer. One example of a brightness enhancing layer is a prismatic brightness enhancing layer, which has a number of prismatic ridges that redirect the illumination light through refraction and reflection. In FIG. 1, a first prismatic brightness enhancing layer 146a provides optical gain in one dimension, and a second prismatic brightness enhancing layer 146b has prismatic structures oriented orthogonally to those of layer 146a, such that the combination of layers 146a, 146b increases the optical gain of the display system 100 in two orthogonal dimensions. In some embodiments, the brightness enhancing layers 146a, 146b may be positioned between the backlight 110 and the reflective polarizer 142.

The different layers in the light management unit 140 may be free standing relative to each other. Alternatively, two or more of the layers in the light management unit 140 may be laminated to each other.

Two design aspects of the multilayer optical film reflective polarizer to be used in the LC display system are of particular relevance to the present application: the manner in which the extruded film is stretched—which in practical effect determines whether the birefringent microlayers are uniaxially birefringent or biaxially birefringent—, and whether layer multiplier devices are used during fabrication, or whether the finished multilayer optical film has more than one distinct stack of microlayers.

We first discuss the manner of stretching or orienting the extruded film. In a first known technique, a long length or web of polymer film continuously advances through a standard tenter apparatus. In the standard tenter, the film is held tautly by sets of clips attached to opposite edges of the film, and the clip sets move forward along rails, under the action of a chain drive or the like. In one section of the tenter, straight sections of the rails diverge from each other such that the clips stretch the film in the cross-web direction (also called the transverse direction) as the clips carry the film generally forward in the down-web direction (also called the longitudinal direction). This orients the film primarily in the cross-web direction. The clips in the standard tenter maintain a constant clip-to-clip spacing and move at a constant speed throughout the length of the straight rail sections, which prevents the film from relaxing in the down-web direction. Due to this down-web constraint of the film during orientation, the stretch provided by such a standard tenter is sometimes referred to as a constrained stretch. As a consequence of the constraint, layers within the film that become birefringent under the conditions of the stretch typically develop three different refractive indices along the three principal directions (the cross-web or x-direction, the down-web or y-direction, and the thickness or z-direction) of the film. If we denote the refractive indices of such a layer along the principal x-, y-, and z-directions as nx, ny, and nz, then nx≠ny, and ny≠nz, and nz≠nx. (To the extent the material exhibits dispersion, whereby a given refractive index n changes somewhat as a function of optical wavelengths, the refractive index may be understood to be specified at a particular visible wavelength such as 550 nm (green) or 632.8 nm (He—Ne laser, red), or the refractive index may be understood to be an average over the visible wavelength range, e.g. from 400-700 nm.) A material having this type of birefringence is said to be biaxially birefringent.

In a reflective polarizer in which birefringent microlayers alternate with isotropic microlayers, a consequence of the birefringent microlayers being biaxially birefringent is that the layer-to-layer refractive index differences along the y-direction and along the z-direction cannot both be zero. This in turn results in residual reflectivity and (when used in a display) perceived color for light that propagates at high oblique angles relative to an optical axis perpendicular to the film, for p-polarized light propagating in a reference plane that includes the y-axis (i.e., the pass axis of the polarizer) and the z-axis.

In a second known technique, the film or web advances through a stretching apparatus that has been specially designed to allow the web or film to fully relax in the down-web direction during the orientation process. For example, in some embodiments the stretching apparatus utilizes sets of clips that move along parabolically-shaped rails. See e.g. U.S. Pat. No. 6,949,212 (Merrill et al.). By allowing the film to relax in the down-web direction (as well as in the thickness direction), layers within the film that become birefringent under the conditions of the stretch typically develop only two different refractive indices along the three principal directions of the film. Stated differently, for such a birefringent layer, the refractive index along the z-direction equals, or substantially equals, the refractive index along the y-direction, but those refractive indices differ substantially from the refractive index along the x-direction (the direction of stretch). Using the nx, ny, nz notation, ny=nz, but nx≠ny, and nx≠nz. (In some cases ny and nz may not be exactly equal, but their difference is very small, as discussed below. Thus, ny nz.) A material having this type of birefringence is said to be uniaxially birefringent. In a reflective polarizer in which birefringent microlayers alternate with isotropic microlayers, a consequence of the birefringent microlayers being uniaxially birefringent is that the layer-to-layer refractive index differences along the y-direction and along the z-direction can both be made to be zero, or substantially zero, while the refractive index difference along the x-direction is nonzero and large in magnitude. This results in little or no significant reflectivity at high oblique angles, and little or no perceived color at such angles when the film is used as a reflective polarizer in a display.

Thus, with regard to off-axis color in a display, a multilayer reflective polarizer whose birefringent microlayers are uniaxially birefringent, e.g. made using a parabolic stretching apparatus, has an inherent advantage relative to a polarizer whose birefringent microlayers are biaxially birefringent, e.g. made using a conventional tenter. However, in practice, with all other factors being equal, a uniaxially birefringent polarizer is more costly to manufacture than a biaxially birefringent polarizer, at least in part due to substantially lower yields for the specialized parabolic stretching apparatus compared to those for the standard tenter.

Optical materials that may be used in the fabrication of the disclosed reflective polarizers can be selected from known materials, preferably transparent polymer materials whose material properties allow for the coextrusion of such materials at the same temperature and in a common feedblock. In exemplary embodiments, layers of alternating thermoplastic polymers (ABABAB . . . ) are used, and one of the polymers is selected to become birefringent, and the other polymer is selected to remain optically isotropic, under the conditions of stretching. Suitable polymers may be judiciously selected from, for example, polyethylene naphthalate (PEN), polyethylene terephthalate (PET), polybutylene terephthalate (PBT), copolymers thereof, and blends thereof. Additionally, other classes of polymers that exhibit birefringence and may be useful for this purpose are polystyrenes (including syndiotactic polystyrene), polyamides (including Nylon6), and liquid crystal polymers.

Regarding the above discussion relating to uniaxial and biaxial birefringence, and equalities and inequalities involving nx, ny, and nz, we recognize that exact equality between two refractive indices may be difficult to achieve or measure, and, from a practical standpoint, small differences may be indistinguishable from exact equality. Therefore, for purposes of this document, we consider a material to be uniaxially birefringent if one pair of its refractive indices are substantially the same, e.g., if they differ by less than 0.05, while remaining pairs of its refractive indices are not substantially the same, e.g., if they differ by at least 0.05. Likewise, a material is considered to be biaxially birefringent if each and every pair of its principal refractive indices are not substantially the same, e.g., if they differ by at least 0.05.

Typically, with regard specifically to multilayer optical film reflective polarizers, a biaxially birefringent layer in such polarizer may for example have refractive indices nx, ny, nz that satisfy the relationships |ny−nz|≥0.05, and |nx−ny|>0.06 or 0.08. In contrast, a uniaxially birefringent layer in such polarizer may for example have refractive indices nx, ny, nz that satisfy the relationships |ny−nz|<0.05, and |nx−ny|>0.06 or 0.08.

Another design aspect of particular relevance to the present application is the number of distinct stacks of microlayers that are present in the finished multilayer reflective polarizer, which is often related to whether layer multiplier devices were used during fabrication of the film. In describing this feature, reference is made to FIG. 2, which schematically depicts a single packet multilayer optical film configured as a reflective polarizer 220.

Figure 2:
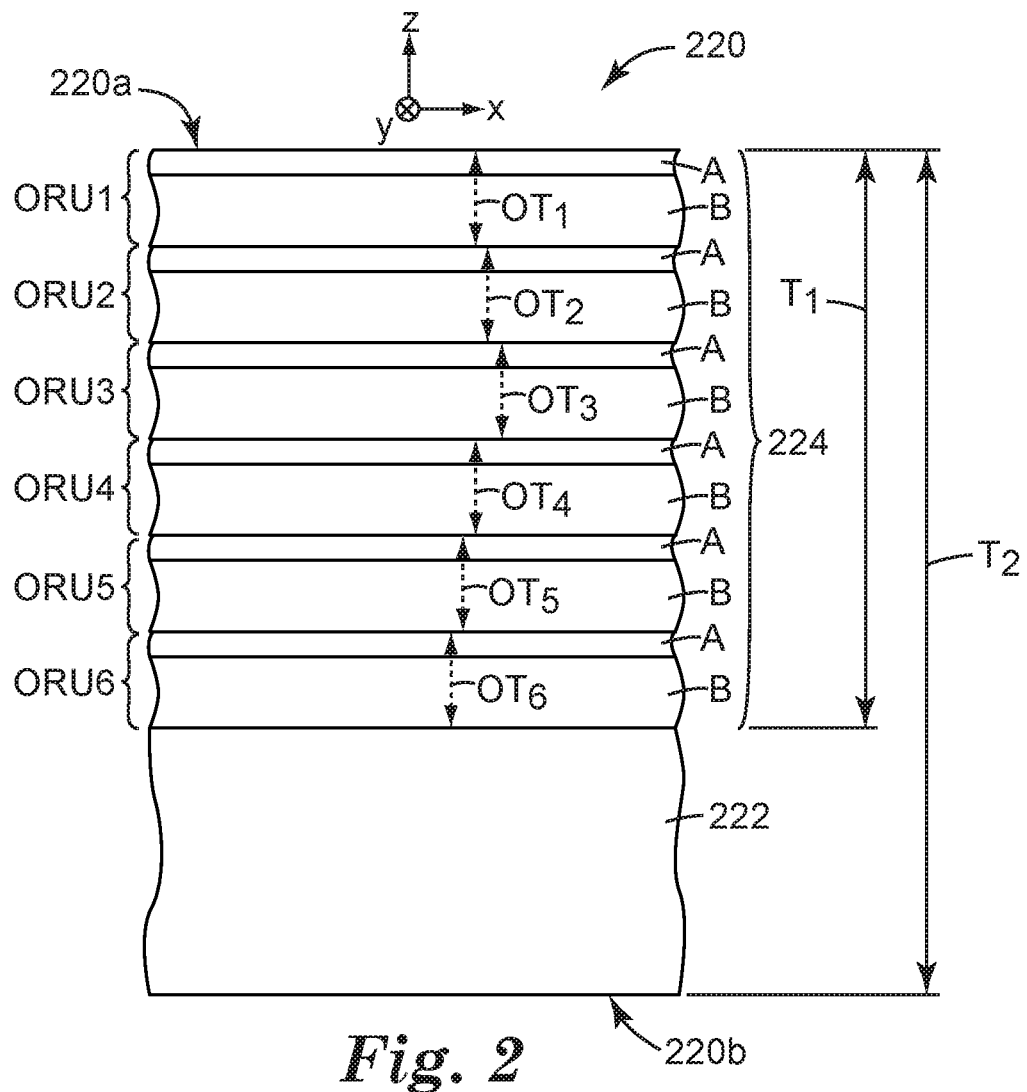
FIG. 2 is a schematic side or sectional view of a single packet multilayer optical film configured as a reflective polarizer.

The multilayer optical film or polarizer 220 has two opposed outer major surfaces 220a, 220b, between which are a plurality of distinct polymer layers. Polymer materials and film-making equipment that can be used to make such a film by coextrusion and stretching are known, see e.g. U.S. Pat. No. 5,882,774 (Jonza et al.) and U.S. Pat. No. 6,783,349 (Neavin et al.), and patent application publication US 2011/0102891 (Derks et al.). Adjacent polymer layers have substantially different refractive indices along at least one of the principal x, y, or z axes, so that some light (depending upon the direction of propagation and the polarization state of the light) is reflected at interfaces between the layers. Some of the polymer layers of the polarizer 220 are sufficiently thin ("optically thin") so that light reflected at a plurality of the interfaces undergoes constructive or destructive interference in order to give the multilayer optical film the desired reflective or transmissive properties. These layers are referred to herein as microlayers, and are labeled "A" and "B" in FIG. 2. For reflective polarizers designed to reflect visible light, each microlayer generally has an optical thickness (i.e, a physical thickness multiplied by its refractive index) of less than about 1 micron. Thicker layers, such as skin layers or protective boundary layers (PBLs), as are known in the art, may also be present in the polarizer, as illustrated in FIG. 2 by the layer 222. Such "optically thick" layers have an optical thickness of at least 1 micron, and often much greater than 1 micron, and are not considered to be microlayers. (Throughout this document, when the term "thickness" is used without the modifier "optical", the thickness refers to the physical thickness, unless otherwise indicated by the context.)

A coherent grouping of microlayers is referred to herein as a packet of microlayers, or microlayer packet. As shown, the polarizer 220 contains only one packet 224 of microlayers. The packet 224 has a (physical) thickness of $T_1$, and the polarizer 220 has an overall thickness of $T_2$, as shown in the figure. Configuring the multilayer optical film with only one packet 224 of microlayers simplifies the manufacturing process (provided the number of microlayers desired is not excessive) and allows for greater control of the thicknesses and thickness profiles of the microlayers, which in turn allows for greater control of the spectral reflectivity and spectral transmission characteristics of the reflective polarizer. In FIG. 2, pairs of adjacent microlayers form optical repeat units (ORUs), labeled ORU1 through ORU6, each ORU having an optical thickness (OT1, OT2, ... OT6) equal to the sum of the optical thicknesses of its constituent microlayers. Although only 6 ORUs (12 microlayers) are shown, the reader will understand that a typical single packet reflective polarizer will contain many more microlayers and ORUs in order to provide adequate reflectivity over the visible spectrum. For example, the total number of microlayers in the single packet reflective polarizer may be less than 500, or less than 400, or less than 350, or in a range from 200 to 500, or from 200 to 400, or from 200 to 350, or from 225 to 325, for example. The optical thickness of an ORU determines the wavelength at which the ORU exhibits peak reflectivity. Careful control of the thicknesses of the ORUs in accordance with a desired layer thickness profile, wherein the optical thicknesses of the ORUs gradually increase from one side of the packet (e.g. near the major surface 220a) to the opposite side of the packet (e.g. near the thick layer 222), allows the packet of microlayers to provide a broad reflectivity over the visible spectrum and over a desired range of observation angles, provided a sufficient number of ORUs are present in the packet.

An alternative approach, to more easily achieve the desired optical performance targets, is to design the multilayer optical film reflective polarizer to have more microlayers than can be practically incorporated into a single packet film. For this reason (or for other reasons), reflective polarizers are made in which the microlayers are divided or separated into two or more distinguishable microlayer packets, with at least one optically thick polymer material separating neighboring packets. Such multiple packet reflective polarizers can be manufactured in various ways. For example, the reflective polarizer can be made using multiple feedblocks (corresponding to the multiple packets) and combining the packets from these feedblocks while the polymer materials are still liquid, rather than using only one feedblock. See e.g. patent application publication US 2011/272849 (Neavin et al.). Alternatively, the reflective polarizer can be made using a layer multiplier device, e.g. as discussed in U.S. Pat. No. 5,882,774 (Jonza et al.) or U.S. Pat. No. 6,025,897 (Weber et al.). The layer multiplier device may for example double or triple the number of microlayers and ORUs, producing two or three times (respectively) the number of packets in the finished reflective polarizer. In still another approach, a multiple packet reflective polarizer can be made by laminating together two or more multilayer optical film reflective polarizers that were each made with, for example, a single feedblock.

Drawbacks of multiple packet reflective polarizers tend to include (a) increased manufacturing cost because of the large number of layers and resulting high material cost, and (b) relatively large overall physical thickness, which can be a significant disadvantage in some display applications. (The disclosed reflective polarizers desirably have a thickness of less than 50 microns, or less than 40 microns, or in a range from 25 to 50 microns or from 25 to 40 microns.) However, the larger number of microlayers allow the multiple packet reflective polarizers to achieve display-quality optical performance targets even when such polarizers are oriented using a standard tenter, that is, even when the birefringent microlayers in such reflective polarizers are biaxially birefringent. This is because the multiple packets can produce a spectral smoothing as described in patent application publication US 2013/0063818 (Weber et al.), resulting in a reduced amount of off-axis color. Single packet reflective polarizers cannot take advantage of this spectral smoothing technique, and have a smaller margin of error with respect to layer thickness variability.

When discussing multilayer optical films made by coextruding numerous layers of alternating polymer materials through a feedblock/die and orienting the film with a stretching operation, and the suitability of such films in visual display applications, one aspect of the film of practical interest to the person of ordinary skill is the degree to which the as-manufactured film is spatially uniform. This aspect of the film is of interest because it relates to how much of the manufactured film can be used, versus how much must be disposed of, in the intended application. This in turn affects the manufacturing yield and cost of manufacture, and it can also place size limitations on how large of a piece can be obtained or cut from a given web of film to fit a large display system. In the case of optical films for use in LC displays, a high degree of spatial uniformity is desirable so that film-related artifacts are not noticeable in the displayed image.

Figure 3:
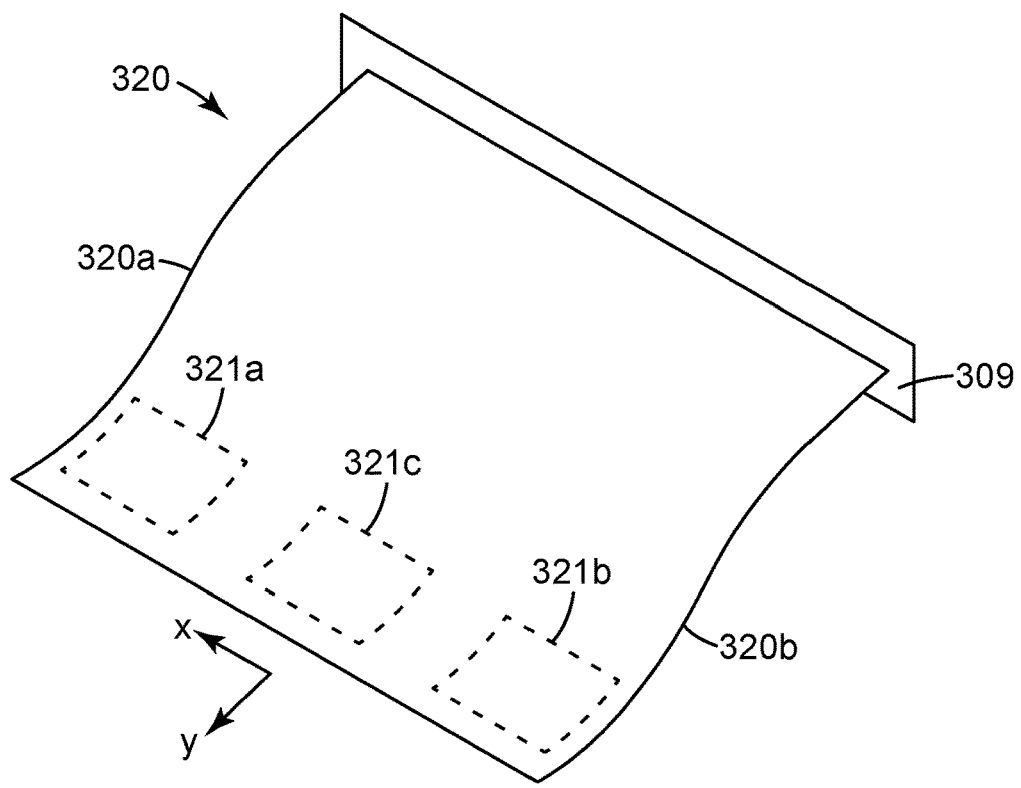
FIG. 3 is a perspective view of a web of optical film.

A web of optical film 320 is shown schematically in FIG. 3. The film 320 is manufactured on a film-making line and emerges from a tenter or other stretching device, which is depicted schematically as element 309. The film 320 has a longitudinal or down-web direction parallel to the y-axis, as shown. The film 320 also has a transverse or cross-web direction parallel to the x-axis, as shown. Two opposed longitudinal edges 320a, 320b define the longitudinal boundaries of the film 320. It is near these edges that the clip sets from the tenter or specialized stretching apparatus grasped the film during a previous orientation step, after which the film 320 was trimmed to the edges 320a, 320b. Three film samples, intended for use as reflective polarizers in a display application or other desired application, are shown in the figure: a film sample 321a near the film edge 320a, a film sample 321b near the film edge 320b, and a film sample 321c in a central portion (in relation to the transverse direction) of the film 320. These film samples or pieces are cut from the larger web or film 320 with a knife, slitter, or other suitable cutting implement. As a reflective polarizer, the optical film 320, and each of the film samples 321a, 321b, 321c, has a block axis parallel to the x-axis, and a pass axis parallel to the y-axis.

In an idealized situation, the film samples 321a, 321b, 321c will all have the same optical characteristics and properties. However, in practice, the film 320 exhibits a certain amount of spatial variability. As a result, the layer thickness profile of the microlayer packet (and its corresponding spectral transmission and reflection characteristics) near an edge of the film 320 differs somewhat from the layer thickness profile (and corresponding spectral transmission and reflection characteristics) in the central portion of the film. The amount of change in the spectral characteristics between the center and edge of the film is particularly significant for the type of multilayer optical film of interest to the present application, namely, a reflective polarizer having only one packet of microlayers and oriented using a standard tenter such that birefringent microlayers in the film are biaxially birefringent. The significant spatial variability contributes to the belief by others that these films would not be acceptable for use in an on-glass configuration as described above.

Figure 4:
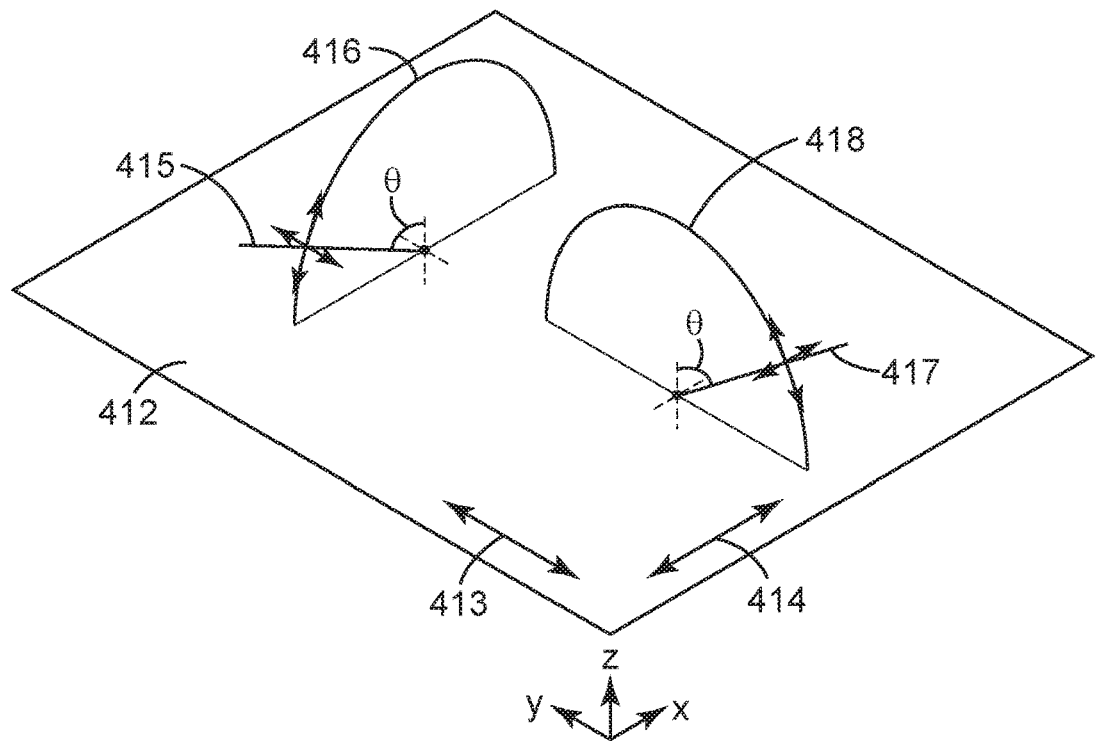
FIG. 4 is a perspective view of an optical film or laminate in relation to a Cartesian coordinate system.

Elsewhere in this document we discuss optical properties such as transmission and reflection of certain polarizing films and laminates at specific angles and polarization states. FIG. 4 is provided to assist the reader in understanding the relevant directions, planes, and angles. In the figure, an optical body 412, which may for example be or comprise a multilayer optical film configured as a reflective polarizer, or such a film laminated to an absorbing polarizer and/or to another optical film or body, is shown in the context of a Cartesian x-y-z coordinate system. As a polarizer, the optical body 412 has a pass axis 413 and a block axis 414, which correspond to the mutually perpendicular y- and x-axes, respectively. The z-axis corresponds to a thickness direction of the body 412, i.e., an axis perpendicular to the plane of the body 412. Light that is normally incident on the body 412 propagates parallel to the z-axis. Such light is substantially transmitted by the body 412 if the light has a linear polarization component parallel to the pass axis 413, and is substantially blocked (reflected in the case of a reflective polarizer, absorbed in the case of an absorbing polarizer) if the light has a linear polarization component parallel to the block axis 414.

For lack of an alternative term, "plane of incidence" is used herein to refer to the reference plane containing the surface normal direction and the light propagation direction, both in cases where the light is incident on the film, and in cases where light is not incident on the film but instead is emerging from the film. Likewise, "incidence angle" is used to refer to the angle between the surface normal direction and the light propagation direction, both for light incident on the film and for light emerging from the film.

Two reference planes of incidence, 416 and 418, are included in the figure: reference plane 416 contains the block axis 414 and the z-axis; and reference plane 418 contains the pass axis 413 and the z-axis. Two obliquely incident light rays 415, 417 are shown in the figure. Ray 415 lies in plane 416, and ray 417 lies in plane 418. The rays 415, 417 are obliquely incident because their directions of propagation form respective non-zero polar angles $\theta$ with respect to the z-axis. For each ray 415, 417, the polarization state of the light ray can be resolved into two orthogonal components, represented in the figure as a pair of orthogonal double-headed arrows: a component whose polarization state is in the plane of incidence, referred to as "p-polarized", and a component whose polarization state is perpendicular to the plane of incidence, referred to as "s-polarized". Inspection of the figure reveals that the polarization direction of p-polarized light for oblique ray 415 is not the same as (and is not parallel to) the polarization direction of p-polarized light for oblique ray 417. Similarly, the polarization direction of s-polarized light for oblique ray 415 is not the same as (and is not parallel to) the polarization direction of s-polarized light for oblique ray 417. Also apparent is that the p-polarized ("p-pol") component of ray 415 is perpendicular to the pass axis 413 and partially aligned with the block axis 414, while the s-polarized ("s-pol") component of ray 415 is parallel to the pass axis 413. The p-pol component of ray 417 is perpendicular to the block axis 414 and partially aligned with the pass axis 413, while the s-pol component of ray 417 is parallel to the block axis 414. From this, one can see that depending on the direction of incidence, p-polarized light can be perpendicular to the pass axis in some cases and perpendicular to the block axis in others, and s-polarized light can be parallel to the pass axis in some cases and parallel to the block axis in others.

Figure 5:
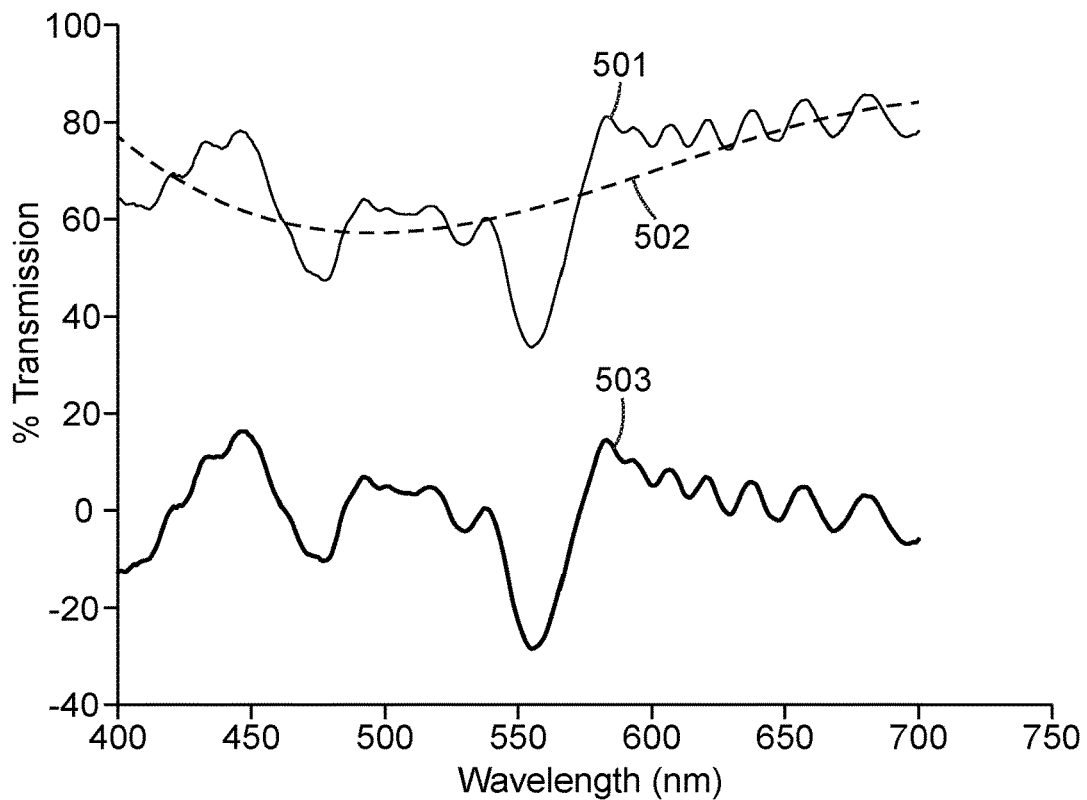
FIG. 5 is a graph of spectral transmission to illustrate the concept of a best-fit curve, which can be used to calculate a high frequency spectral variability parameter A.

One way of quantifying the color associated with a given transmission (or reflection) spectrum involves calculating the high frequency spectral variability of the spectrum over a range of visible wavelengths. We refer to the calculated high frequency spectral variability as $\Delta$, i.e., the Greek letter delta. Curves that help illustrate this approach are shown in the transmission versus wavelength graph of FIG. 5. In the graph, curve 501 is an arbitrary curve of transmission versus wavelength for a given polarizer in a given illumination geometry. The curve 501 exhibits some variability over the visible wavelength range, which we may assume to extend from 400 to 700 nm, although other reasonable endpoint wavelengths may instead be used. The variability of the curve 501 is manifested to a user or viewer as a colored (non-white) appearance when the film is illuminated with white light. Of particular interest is any color that is due to relatively high frequency variability as a function of wavelength. For example, spectral variability having a period of roughly 20 nm or less can result in a viewed color that changes rapidly, both spatially and angularly.

To quantify the high frequency variability $\Delta$, and thus the color associated with such variability, we first define a smoothed spectrum with which to compare the curve 501. The smoothed spectrum should be a best-fit curve to the curve 501, e.g., from a least-squares or weighted least-squares sense, and the smoothed spectrum should be a low mathematical order polynomial so that only the higher mathematical orders—corresponding to higher frequency variability—are included in the comparison. Preferably, the smoothed spectrum is a best-fit curve of third order in wavelength, i.e., a third order polynomial as follows:

$$a_0+a_1\lambda+a_2\lambda^2+a_3\lambda^3,$$

where the coefficients $a_0$, $a_1$, $a_2$, and $a_3$ are selected according to a least-squares methodology. Such a best-fit third order spectrum was calculated for the curve 501, the result being curve 502. The actual transmission (curve 501) can then be compared to the best-fit spectrum (curve 502) by subtracting curve 502 from curve 501, the result being a comparison curve 503. Note that the comparison curve 503 is not physically meaningful insofar as it contains values of transmission that are negative. Nevertheless, the curve 503 can be used to derive a physically meaningful value for the high frequency variability content of the curve 501. To do so, we calculate the statistical standard deviation of the comparison curve 503 over the same visible spectrum, e.g. from 400 to 700 nm. For the curve 503 illustrated in FIG. 5, this standard deviation equals 9.18%, or 0.0918. The high frequency variability Δ of the curve 501 can thus be said to be 9.18%, or 0.0918. The units of this high frequency variability number are the same as the units of the curves 501, 502, and 503. Thus, if the units of the curves 501, etc. are given as percent transmission (0% minimum, 100% maximum), then the units of the high frequency variability are also percent transmission, or simply percent. If instead the units of the curves 501, etc. are given as simply the transmission (0.0 minimum, 1.0 maximum), then the units of the high frequency variability Δ are also simply transmission, with no percent.

Figure 6:
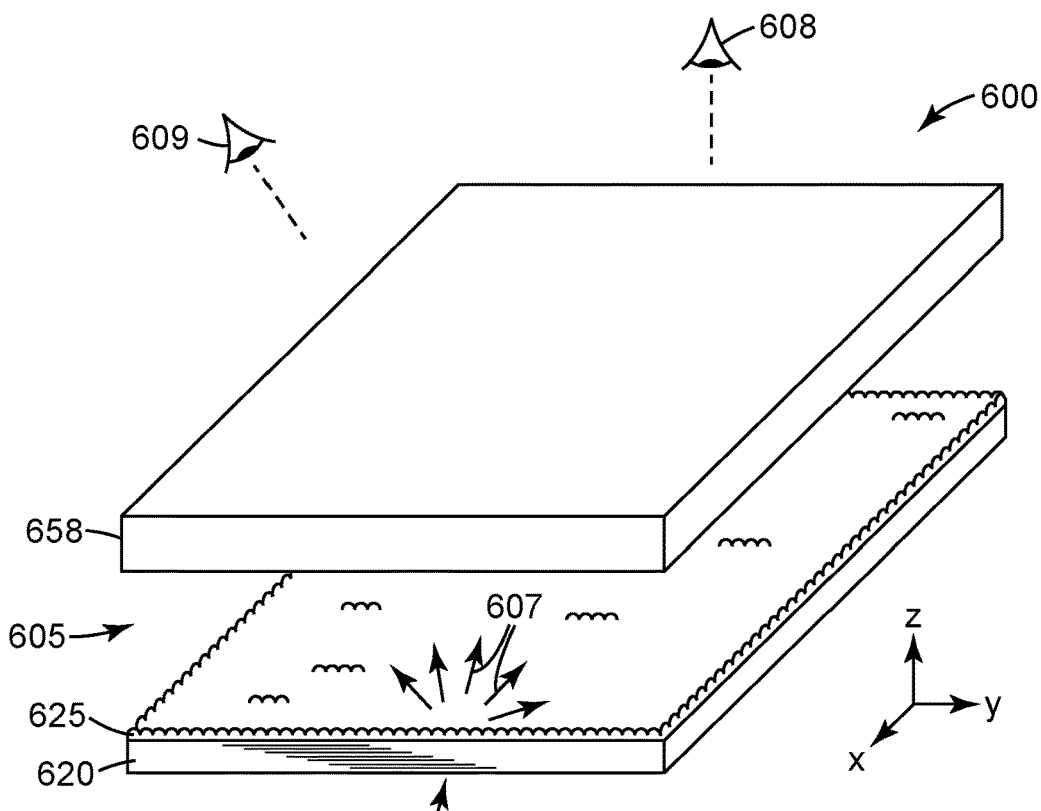
FIG. 6 is a schematic perspective view of a multilayer optical film reflective polarizer disposed behind and spaced apart from an absorbing polarizer, the reflective polarizer provided with a light diffusing layer to reduce the amount of observed color.

Turning now to FIG. 6, we see there schematically illustrated selected elements of an LC display system 600. The selected elements shown are a back absorbing polarizer 658 (which may be the same as or similar to the back absorbing polarizer 158 in FIG. 1), a multilayer optical film reflective polarizer 620 (which may be the same as or similar to the reflective polarizer 142 of FIG. 1, or the reflective polarizer 220 of FIG. 2), and a light diffusing layer 625 disposed on the front major surface of the reflective polarizer 620. Other components that would be included in the LC display system, such as an LC panel, a front absorbing polarizer, and a backlight, are omitted from the figure for simplicity. The optical films lie generally in, or parallel to, the x-y plane. A first user or viewer 608 is located in front of the system 600 and views the display at normal incidence, along a system optical axis parallel to the z-axis. A second user or viewer 609 is also located in front of the system 600, but views the display at an oblique angle.

The back absorbing polarizer 658 is assumed to be any of the absorbing polarizers known in the art for their suitability in LC displays. The polarizer 658 has a pass axis and a block axis (not shown in FIG. 6), the polarizer being oriented such that the pass axis is parallel to the y-axis, and the block axis is parallel to the x-axis.

The reflective polarizer 620 is assumed to be a multilayer optical film of alternating polymer layers in which there is only one packet of microlayers. It is further assumed that the polarizer 620 has been oriented using a standard tenter, such that birefringent layers of the polarizer 620 are biaxially birefringent. FIG. 6 depicts the polarizer 620 in a stand-alone configuration, in keeping with the belief by others that this type of reflective polarizer 620 is not suitable for an on-glass configuration due to excessive off-axis color of the polarizer 620. Thus, the reflective polarizer 620 is separated from the absorbing polarizer 658 by an air gap 605. Furthermore, the reflective polarizer 620 is provided with a light diffusing layer 625 on one major surface thereof, the diffusing layer 625 being disposed between the reflective polarizer 620 and the absorbing polarizer 658. The light diffusing layer 625 scatters light into a cone or distribution of angles as shown by incident light ray 606 and scattered light rays 607. The scattering effectively mixes light rays that propagate through the reflective polarizer 620 in different directions to reduce or eliminate color associated with the reflective polarizer 620. The diffusing layer 625 is assumed to have a relatively high haze, e.g. at least 40%, as measured using a Haze Guard Plus haze meter. The diffusing layer 625 may be of any known type or design, for example, it may comprise glass or ceramic beads or other particles immersed in a matrix of a different refractive index, or it may comprise a textured, faceted, or otherwise non-smooth major surface at a polymer/air or polymer/polymer interface.

As already mentioned, we have found through investigation and testing that, contrary to prevailing opinion, a single-packet, biaxially birefringent reflective polarizer can provide acceptable optical performance in an on-glass configuration, i.e., when laminated to a back absorbing polarizer (with no diffusing layer or structure therebetween, although in some cases such a layer or structure may be included that has a relatively low haze, e.g., less than 30%, or less than 20%, or less than 10% haze). Two examples of an on-glass configuration are shown in FIGS. 7 and 8.

Figure 7:
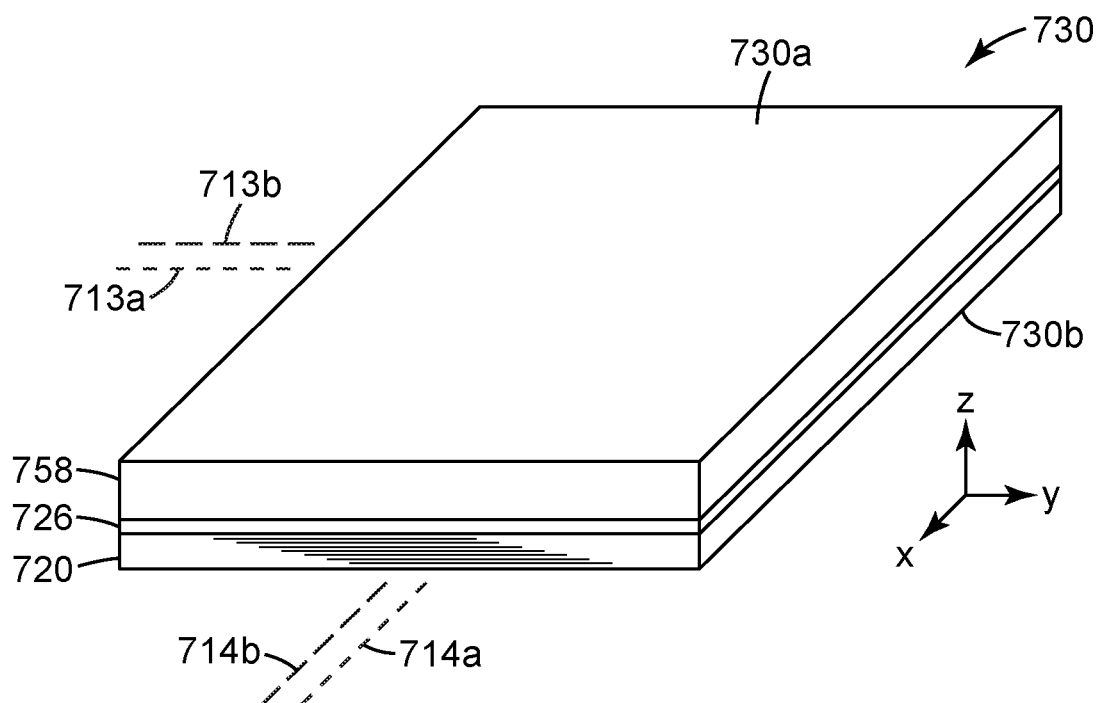
FIG. 7 is a schematic perspective view of a laminate of a multilayer optical film reflective polarizer and an absorbing polarizer, with no light diffusing layer.
Figure 8:
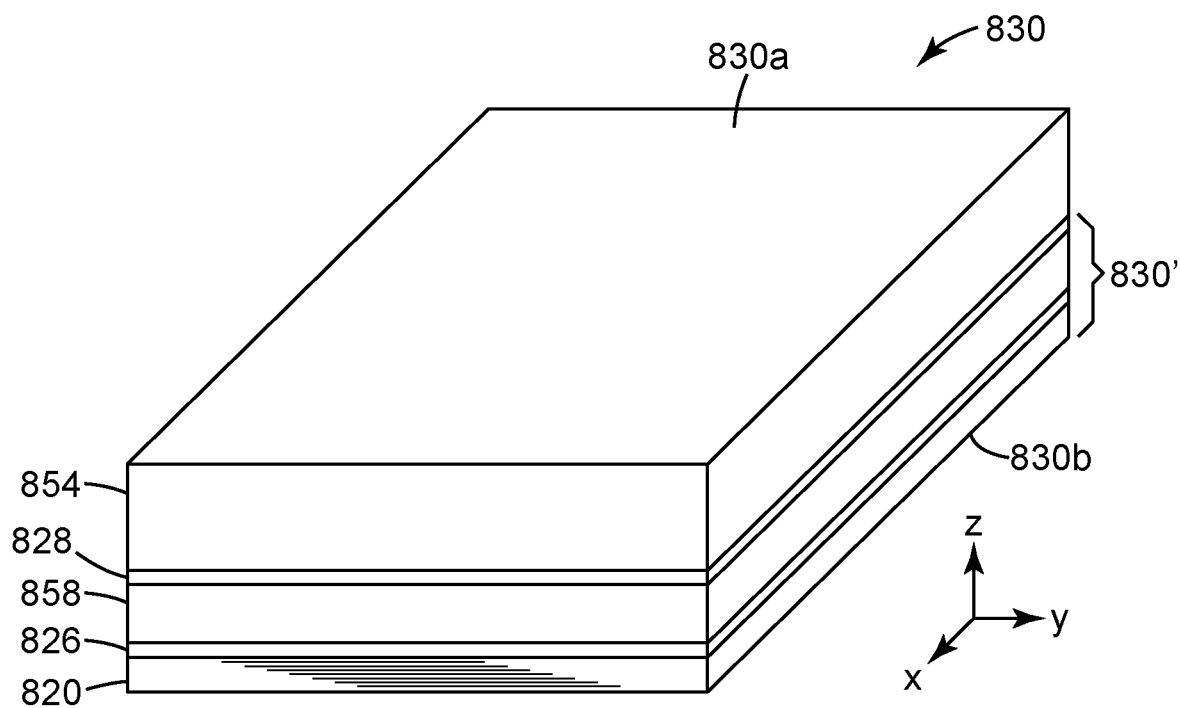
FIG. 8 is a schematic perspective view of a laminate similar to that of FIG. 7 but further including a glass layer from a liquid crystal panel, the absorbing polarizer being disposed between the reflective polarizer and the glass layer.

In the schematic view of FIG. 7, a laminate 730 or optical body is shown, wherein a multilayer optical film reflective polarizer 720 attaches to a back absorbing polarizer 758 by a transparent adhesive layer 726. The reflective polarizer 720, the back absorbing polarizer 758, and the adhesive layer 726 are all coextensive with each other, and there is no air gap between the reflective polarizer 720 and the absorbing polarizer 758. A viewer side of the laminate 730 is in the positive z direction, thus, the back absorbing polarizer 758 may be considered to be in front of the reflective polarizer 720. The reflective polarizer 720 may be the same as or similar to the reflective polarizer 620 described above. Thus, the reflective polarizer 720 is a single packet multilayer optical film made by coextrusion of alternating polymer layers, the film having birefringent microlayers that are biaxially birefringent as a result of the polarizer 720 having been subjected to a constrained stretch on a conventional tenter. The reflective polarizer 720 may be a central portion of a reflective polarizer web, see e.g. film sample 321c in FIG. 3, or it may be an edge portion, see e.g. film samples 321a, 321b.

The reflective polarizer 720 has a pass axis 713a, generally parallel to the y-axis, and a block axis 714a, generally parallel to the x-axis. The number of ORUs in the single microlayer packet, and the thickness profile of those ORUs, provides the reflective polarizer 720 with a high transmission for normally incident visible light polarized parallel to the pass axis 713a, and a low transmission (and high reflection, since transmission+reflection is about equal to 100% for these low-absorption multilayer optical films) for normally incident visible light polarized parallel to the block axis 714a. For example, the transmission of normally incident visible light polarized parallel to the pass axis 713a may be at least 60%, or at least 70%, or at least 80% when averaged over the visible wavelength range, and the transmission of normally incident visible light polarized parallel to the block axis 714a may be less than 30%, or less than 20%, or less than 10%, when averaged over the visible wavelength range. Optical performance of the reflective polarizer 720 for oblique p-polarized light, incident in a reference plane that contains the z-axis and the pass axis 713*a*, is influenced by the unavoidable layer-to-layer refractive index mismatches resulting from the biaxially birefringent nature of the birefringent microlayers in the film. For such oblique light at a 60 degree polar angle of incidence, the transmission of the reflective polarizer 720 has a value in a range from 70% to 90%, or from 70% to 85%, for at least some wavelengths from 450 to 700 nm; in some cases, the transmission for such oblique light may be less than 90% throughout a wavelength range from 400 to 500 nm.

The reflective polarizer 720 may have an overall thickness of less than 50 microns, or less than 40 microns, or it may be in a range from 20 to 50 microns, or in a range from 20 to 40 microns, or in a range from 25 to 40 microns. The layer thickness profile of the ORUs in the microlayer packet of the polarizer 720 may be tailored so that the high frequency spectral variability Δ for the transmission of the polarizer for the oblique 60 degree p-polarized light is less than 0.08 (i.e., less than 8%), or less than 0.05 (i.e., less than 5%), as calculated over a wavelength range from 400 to 700 nm relative to a best fit curve that is a third order polynomial with wavelength.

The back absorbing polarizer 758, which has a pass axis 713*b* and a block axis 714*b*, may be the same as or similar to the back absorbing polarizer 658 described above. The absorbing polarizer 758 is oriented relative to the reflective polarizer 720 such that the pass axes 713*a*, 713*b* are substantially aligned, and the block axes 714*a*, 714*b* are also substantially aligned. For example, two such substantially aligned axes may be characterized by an angular deviation of less than 1 degree, or less than 0.1 degrees.

The transparent adhesive layer 726 may be any suitable optical adhesive, for example, any of the Optically Clear Adhesive products available from 3M Company, St. Paul, Minn. The refractive index of the adhesive layer 726 is desirably reasonably close to the refractive index of the absorbing polarizer 758 and the refractive indices of the reflective polarizer 720, to avoid Fresnel reflection at the polymer/adhesive interfaces of those films. The adhesive layer 726 preferably provides a permanent bond between the absorbing polarizer 758 and the reflective polarizer 720.

The laminate 730 may consist (only) of, or it may consist essentially of, the reflective polarizer 720, the absorbing polarizer 758, and the adhesive layer 726. In some embodiments, the laminate 730, and each of these three components, does not incorporate any significant identifiable light diffusing layer or structure, such as beads or other particles of different refractive index, or a textured or other non-smooth major surface. The laminate 730 may thus be devoid of any such light diffusing layer or structure. However, in cases where the laminate 730 does include such a diffusing layer or structure, it is often desirable to at least ensure that no such diffusing layer or structure is disposed between the reflective polarizer 720 and the absorbing polarizer 758. The foregoing statements are made with the recognition that even ideal, flat optical films and layers with exceptional optical clarity may exhibit a minute but measureable amount of optical scattering or diffusion. Thus, for clarity, we may establish a minimal threshold below which the layer or structure at issue may be considered, from a practical standpoint and for the purposes of the present document, to have no light diffusion. We set this minimal light diffusion threshold at a haze value of 5%, or 4%, or 3%, or 2%, or 1%, as measured using a Haze Guard Plus haze meter from BYK-Gardiner, Silver Springs, Md., according to a suitable procedure such as that described in ASTM D1003.

Optical films are often sold and/or shipped with a temporary polymeric release liner on both sides to protect the major surfaces of the film from scratches or other damage. Such release liners can be easily removed from the product by peeling. The release liners can incorporate dyes, pigments, or other agents, including light diffusing agents, so they can be easily seen or detected by the user. Such temporary release liners may be applied to the outer surfaces of the laminate 730 as well. However, such release liners are distinguishable from, and need not be considered part of, the laminate 730. Thus, to the extent such release liners are present on the laminate 730 (or on other laminates disclosed herein, including laminate 830 below) and have a substantial light diffusion property, it can still be correct to state that the laminate does not incorporate any significant light diffusing layer or structure.

The reader should be cautioned, however, that in some cases it can be desirable to include one or more moderate diffusing layers or structures between the reflective polarizer 720 and the absorbing polarizer 758, such moderate diffusing layers or structures having an amount of haze that is significant, i.e., greater than the above-mentioned minimal light diffusion threshold, yet smaller than high haze diffusers typically found in stand-alone configurations such as that of FIG. 6. A diffusing layer or structure may for example be included between the reflective polarizer 720 and the absorbing polarizer 758 that has a relatively low haze, e.g., less than 30%, or less than 20%, or less than 10% haze.

The layer thickness profile used in the disclosed biaxially birefringent reflective polarizers warrants some additional discussion. As already mentioned, the microlayers in the microlayer packet are organized into optical repeat units (ORUs), and the optical thicknesses of the ORUs (and microlayers) are tailored to provide, for light throughout the visible spectrum, a high broadband reflectivity for light of the block polarization, and a high broadband transmission (low reflectivity) for light of the pass polarization, over a desired range of incidence angles and directions. This is typically accomplished by tailoring the thickness profile of the ORUs along the thickness direction (z-axis) of the film to be a monotonic, or near-monotonic, function, with thinner ORUs located generally at one side of the packet (referred to here as the thin side), and thicker ORUs located generally at the opposite side of the packet (referred to here as the thick side). In order to reduce the undesirable perceived off-axis transmitted color of the disclosed films, it can be useful in at least some embodiments to (a) orient the reflective polarizer such that the thick side of the microlayer packet faces the observer (or absorbing polarizer or LC panel), and the thin side of the microlayer packet faces the backlight, and (b) tailor the ORU thickness profile to be smoothly varying so that the spectral transmission of the film for highly oblique incident light of the pass polarization state is likewise smoothly varying over the visible spectrum, and (c) tailor the ORU thickness profile in such a way as to avoid an excessive number of ORUs at the thick end of the packet beyond the point at which an ORU has a resonant reflectivity peak at 650 nm at the oblique angle limit, even though such tailoring can produce an undulation in the transmission spectrum of the reflective polarizer for pass state light incident at or near the oblique angle limit.

Another laminate 830 or optical body is shown in FIG. 8. The laminate 830 may be the same as or similar to the laminate 730 as described above, except that two additional layers have been added. Thus, the laminate 830 includes a back absorbing polarizer 858, a multilayer optical film reflective polarizer 820, and an adhesive layer 826 that bonds the absorbing polarizer 858 to the reflective polarizer 820. These elements may be the same as or similar to corresponding elements of the laminate 730, and they form an optical body or structure 830' which may thus be the same as or similar to the laminate 730, except that the front of structure 830' is attached to additional layers. In particular, the front major surface of the back reflective polarizer 858 is bonded to a glass layer 854 through an adhesive layer 828. The adhesive layer 828 may be the same as or similar to the adhesive layer 826. The glass layer may be the back or rear panel plate of a liquid crystal panel, such as the panel plate 154b of the LC panel 150, described above.

The laminate 830 may consist (only) of, or it may consist essentially of, the elements 820, 826, 858, 828, and 854 as described above. Similar to the laminate 730, the laminate 830 and each of its components preferably does not incorporate any significant identifiable light diffusing layer or structure, such as beads or other particles of different refractive index, or a textured or other non-smooth major surface. The laminate 830 may thus be devoid of any such light diffusing layer or structure. However, in cases where the laminate 830 does include such a diffusing layer or structure, it is often desirable to at least ensure that no such diffusing layer or structure is disposed between the reflective polarizer 820 and the absorbing polarizer 858. As discussed above, even ideal, flat optical films and layers with exceptional optical clarity may exhibit measureable optical scattering, and we may establish a minimal threshold below which the layer or structure at issue may be considered to have no light diffusion for purposes of the present document. Suitable threshold values are given above. Furthermore, in some cases it can be desirable to include one or more diffusing layers or structures between the reflective polarizer 820 and the absorbing polarizer 858 that have a small but significant amount of haze, e.g., less than 30%, or less than 20%, or less than 10% haze.

EXAMPLES

Several reflective polarizers, and laminates using such polarizers, were made and tested. All of the reflective polarizers were fabricated by coextruding numerous layers of two alternating polymer materials through a feedblock and die, and orienting the film with a stretching operation to produce a multilayer optical film reflective polarizer. For each film, one of the polymer materials became birefringent under the conditions of the stretch, while the other polymer material remained substantially isotropic.

In brief, one of the reflective polarizers, "Example 1", was made using no layer multiplier device and had only one packet of microlayers. Further, the Example 1 polarizer was oriented using a standard tenter, such that the birefringent microlayers in the film were biaxially birefringent. Another reflective polarizer, "Comparative Example 1", was similar in design and construction to the Example 1 polarizer, but the layer thickness profile of the ORUs in the packet of microlayers was less controlled than that of the Example 1 polarizer, and hence the spectral transmission over visible wavelengths was more variable. Another reflective polarizer, "Comparative Example 2", was made using a layer multiplier device that produced three distinct microlayer packets in the film. Similar to Example 1 and Comparative Example 1, the Comparative Example 2 polarizer was oriented using a standard tenter, producing biaxially birefringent microlayers. Another reflective polarizer, "Comparative Example 3", was made with only one packet of microlayers, but was oriented using a parabolic stretching apparatus, producing uniaxially birefringent microlayers. Samples of these reflective polarizers were obtained from both central portions and edge portions of their respective film web, as explained below. The Example 1, Comparative Example 2, and Comparative Example 3 reflective polarizers are representative of reflective polarizer products that have been offered for sale in the United States for more than one year. However, applicants are not aware of the Example 1 reflective polarizer ever being sold or used in an on-glass configuration, e.g., in laminate form with an absorbing polarizer.

Example 1

Of the two alternating polymer materials used to make the Example 1 polarizer, the birefringent polymer was a copolyester (referred to here as 90/10 coPEN) composed of 90 mol % naphthalene dicarboxylate and 10 mol % dimethyl terephthalate, with 100% of the diol being ethylene glycol. The isotropic polymer was a blend of 58 wt % of PETg GN071 from Eastman Chemical Company, Kingsport, Tenn., and 42 wt % of the 90/10 coPEN. This copolymer has an isotropic refractive index of about 1.593 for 633 nm light. These two polymer materials were coextruded using a 275 layer feedblock and film-making equipment similar to that described in U.S. Pat. No. 6,783,349 (Neavin et al.), except that no layer multiplier device was used. The layer thickness profile of the 275 layers (approximately 137 ORUs) was controlled to substantially match a target monotonic optical thickness profile using an axial rod heater disposed in the feedblock whose temperature profile was dynamically adjusted along its length during coextrusion to maintain the target layer thickness profile with a minimum of deviation. The finished polarizing film, referred to herein as the Example 1 polarizer, included an optically thick skin layer composed of PETg GN071 at both the front and back of the microlayer packet, the skin layers forming the outermost layers of the film exposed to air. The Example 1 polarizer was oriented in a standard tenter as described above with a draw ratio of about 6:1 in the transverse direction and 1:1 in the machine direction (longitudinal direction), at a rate of about 60% per second. For this film, the temperature in the pre-heat zone (where the film is heated before substantial stretching occurs) was 312 degrees F., the temperature in the stretch zone (where the film is stretched) was 287 degrees F., and the temperature in the heat-set zone (where the film is still gripped by the tenter clips after the stretch zone) was 290 degrees F. In the heat-set zone, the film was relaxed 0.3% in the transverse direction and the length was unchanged in the machine direction.

The Example 1 polarizer had a finished film thickness of about 30 microns, with each outer skin layer having a thickness of about 1 micron.

Comparative Example 1

The Comparative Example 1 polarizer was made in the same manner as the Example 1 polarizer, except that: (a) the isotropic polymer was the PETg GN071 material discussed above (whose refractive index, 1.563 for 633 inn light, is lower than that of the isotropic polymer of Example 1), and (b) the temperature profile of the axial rod heater was not adjusted in the same manner as in Example 1. This resulted in a layer thickness profile of the 275 layers (approximately 137 ORUs) that was not optimized to substantially match the target monotonic optical thickness profile of Example 1, which in turn resulted in a more highly variable transmission spectra, and more colorful appearance at oblique angles. The Comparative Example polarizing film was oriented in the standard tenter to about 6:1 in the transverse direction and 1:1 in the machine (longitudinal) direction.

The Comparative Example 1 polarizer had a finished film thickness of about 32 microns, with each outer skin layer having a thickness of about 1 micron.

Comparative Example 2

Of the two alternating polymer materials used to make the Comparative Example 2 polarizer, the birefringent polymer was polyethylene naphthalate (PEN). The isotropic polymer was a copolyester (referred to here as coPEN 55/45 HD) composed of 55 mol % naphthalene dicarboxylate, and 45 mol % dimethyl terephthalate with 96 mol % of the diol being ethylene glycol and 8 mol % of the diol being hexanediol. These two polymer materials were coextruded in an alternating layer arrangement having 275 total layers, and the extrudate was sent through a 3:1 layer multiplier device that divides the extrudate and stacks the three extrudate components (packets) atop each other. The layer thickness profiles of the individual packets are managed by use of an axial rod heater system to avoid an excessive number of microlayers or ORUs at a particular thickness so as to avoid having reflectivity peaks for any particular wavelength. The resulting cast web was further processed and stretched in a standard tenter to a draw ratio of about 6:1 in the transverse direction and a draw ratio of 1:1 in the machine (longitudinal) direction. This produces a reflective polarizing film with about 825 total microlayers separated into three distinct microlayer packets of 275 microlayers (about 137 ORUs) each, with optically thick protective boundary layers (PBLs), as mentioned above, therebetween, and optically thick skin layers composed of the PETg GN071 material at the outer major surfaces.

The Comparative Example 2 polarizer had a finished film thickness of about 94 microns, with each outer skin layer having a thickness of about 7 microns, and each PBL having a thickness of about 4 microns.

Comparative Example 3

Of the two alternating polymer materials used to make the Comparative Example 3 polarizer, the birefringent polymer was the 90/10 coPEN, The isotropic polymer was a copolymer composed of 85 wt % Xylex EXXX0282, available from SABIC located in Riyadh, Saudi Arabia, and 15 wt % PETg GN071 from Eastman Chemical Co. These two polymer materials were coextruded in an alternating layer arrangement with 275 total layers, which became 275 microlayers (about 137 ORUs) in the single packet finished film. The layer thickness profile of the 275 layers was controlled to substantially match a target monotonic optical thickness profile using an axial rod heater disposed in the feedblock, whose temperature profile was dynamically adjusted along its length during coextrusion to maintain the target layer thickness profile with a minimum of deviation. The cast web was further processed and stretched with a parabolic stretching apparatus as described in U.S. Pat. No. 6,949,212 (Merrill et al.), with a transverse direction draw ratio of about 6:1 and a machine (longitudinal) direction stretch ratio of about 0.5:1 (i.e., reduced to ½ of its length in the machine direction) to produce a finished reflective polarizing film with 275 total microlayers arranged into a single microlayer packet with optically thick skin layers at the outer major surfaces. As described in the '212 Merrill et al. patent, for these multi-layered materials and this type of deformation, there is a close match in refractive index along the y- and z-directions between adjacent birefringent and isotropic microlayers, so that there is very little reflectivity produced by the multi-layer stack for p-pol pass state light at any angle of incidence.

Samples of these four reflective polarizer films were then taken from different places on their respective film webs, e.g. as suggested by FIG. 3, and the samples were tested. FIGS. 9 through 14 show some of the test results.

Figure 9:
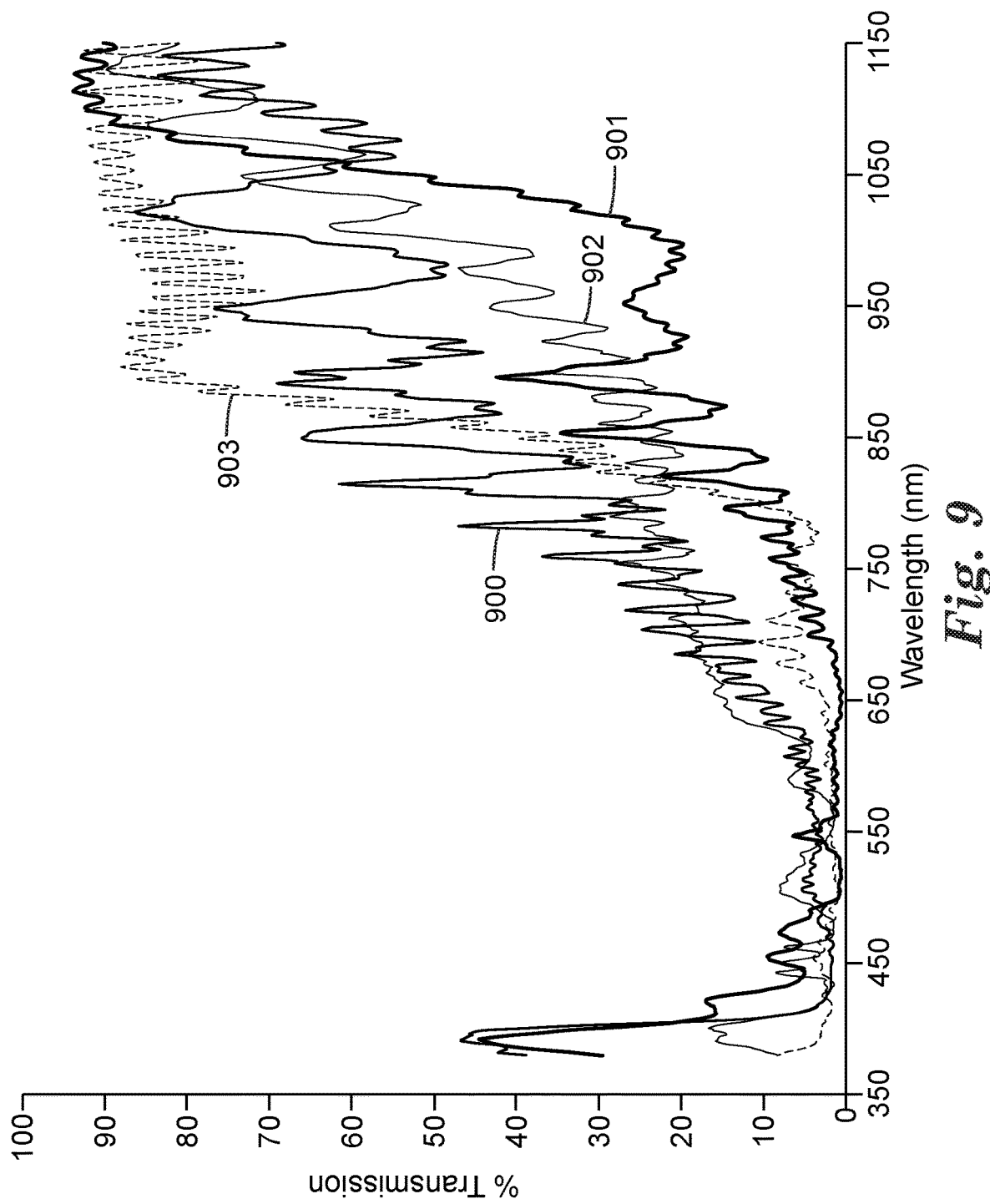
FIG. 9 is a graph of the spectral transmission at normal incidence for four multilayer optical film reflective polarizer samples, for light polarized along the block axis, each sample being obtained from a central portion of its respective film web.

FIG. 9 shows the measured transmission for normally incident light polarized parallel to the block axis of each reflective polarizer sample. These measurements are for reflective polarizer film samples taken from the central portion of each respective film web. Curve 900 is the measured transmission for a sample of the Example 1 reflective polarizer. Curves 901, 902, and 903 are the measured transmission for samples of the Comparative Example 1, Comparative Example 2, and Comparative Example 3 reflective polarizers, respectively.

Figure 10:
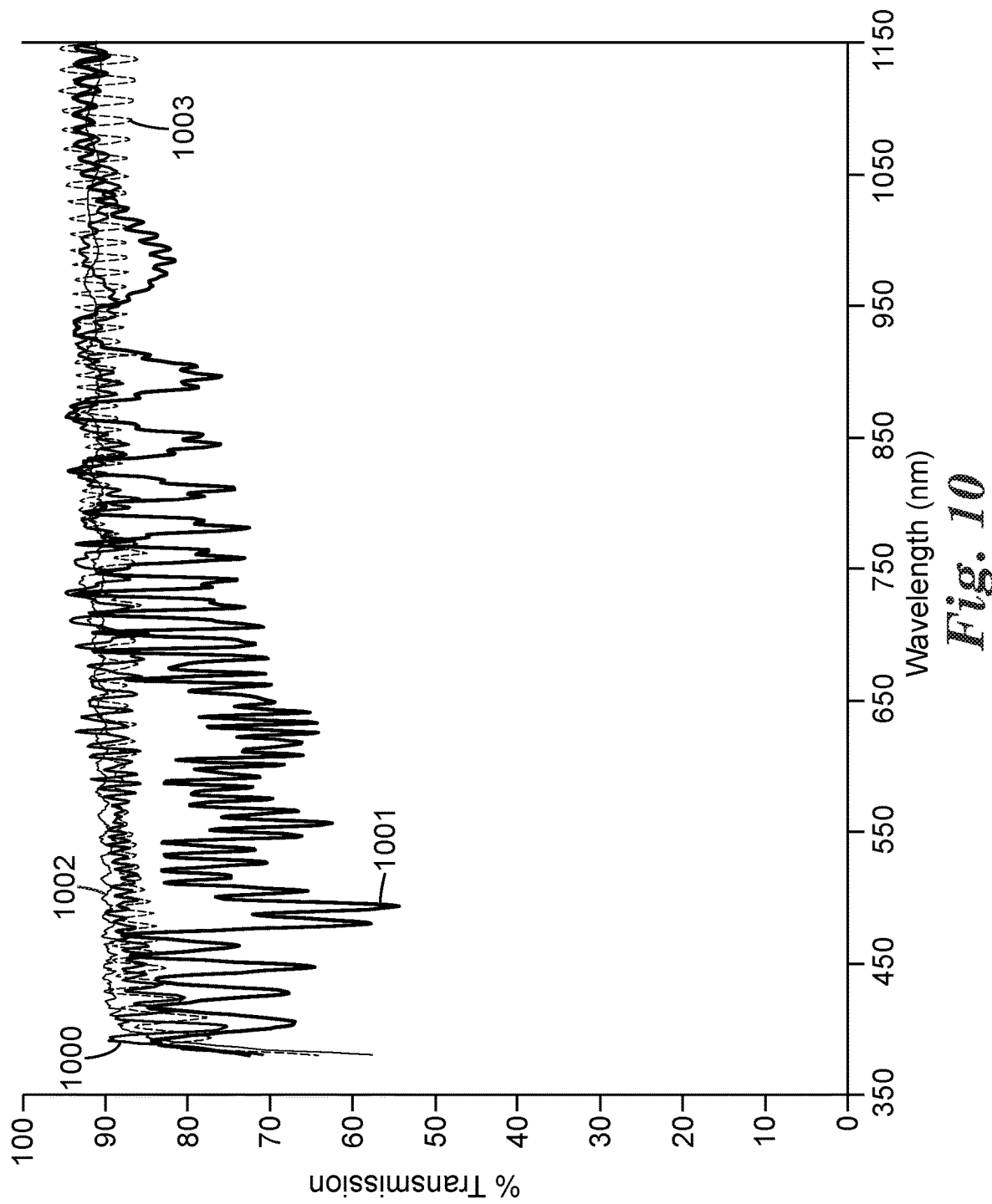
FIG. 10 is a graph similar to that of FIG. 9 for the four reflective polarizer samples, but for normally incident light polarized along the pass axis.

FIG. 10 is a graph similar to that of FIG. 9 for the same four reflective polarizer samples, but for normally incident light polarized parallel to the pass axis of each such polarizer. Thus, curve 1000 is the measured transmission for the Example 1 sample, and curves 1001, 1002, and 1003 are the measured transmission for samples of the Comparative Example 1, Comparative Example 2, and Comparative Example 3 samples, respectively.

The polarizing films were also evaluated by visual observation at normal incidence. Each of the four reflective polarizer samples from FIGS. 9 and 10 (which were taken from the central portions of the respective film webs) were observed at normal incidence with white light illumination, and each of those polarizer samples exhibited little or no color in transmission. That is, when placing a given polarizer sample between a white light source and the viewer's eye, at normal incidence, the polarizer sample did not substantially change the white appearance of the light source. This was also found to be true for samples of the Example 1 reflective polarizer, Comparative Example 1 reflective polarizer, Comparative Example 2 reflective polarizer, and Comparative Example 3 reflective polarizer that were taken from edge portions of each respective film web.

Figure 11:
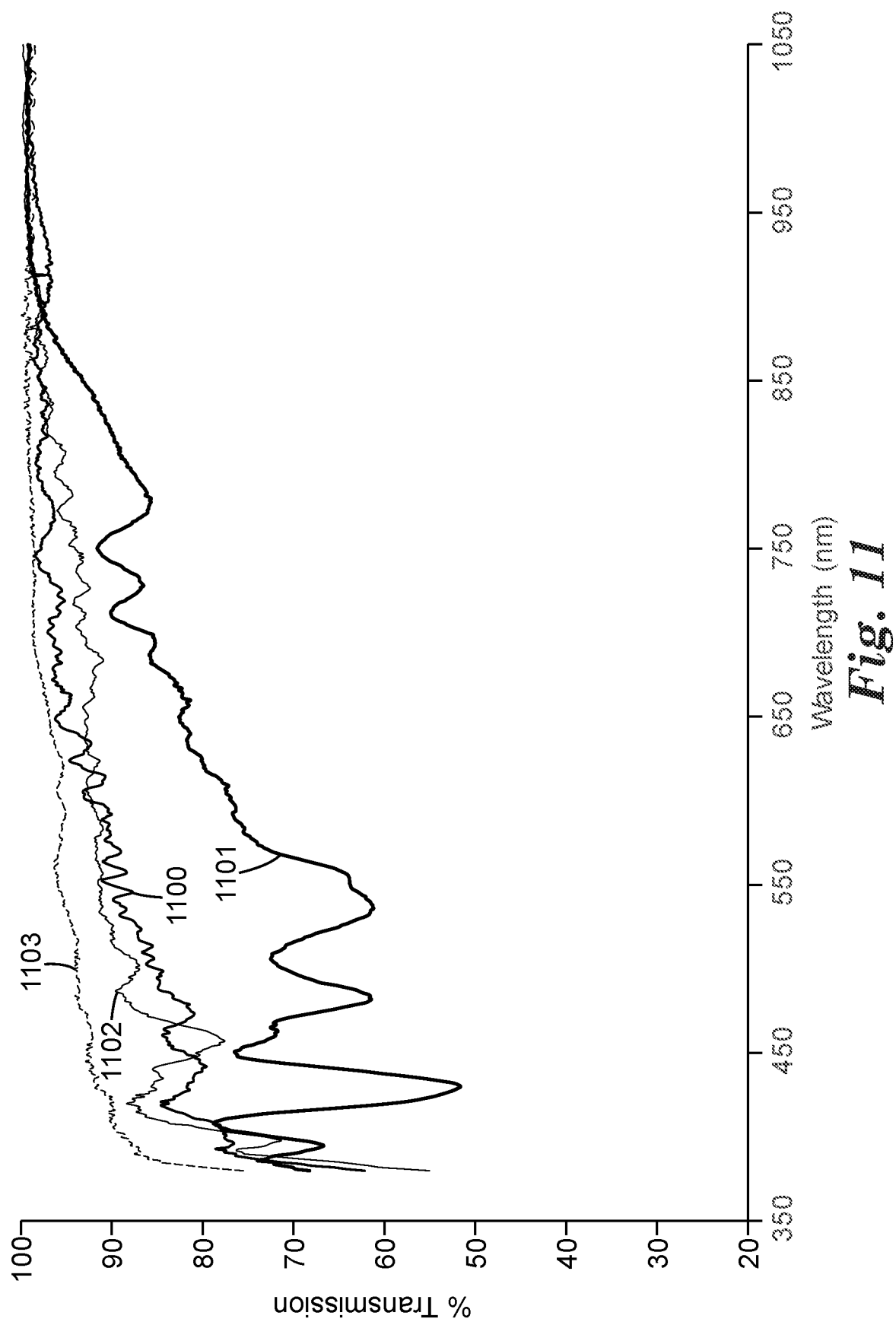
FIG. 11 is a graph similar to that of FIG. 10 for the four reflective polarizer samples, but where the light is incident at a 60 degree polar angle in a plane that includes the pass axis and the normal axis, the light being p-polarized in such plane of incidence.
Figure 12:
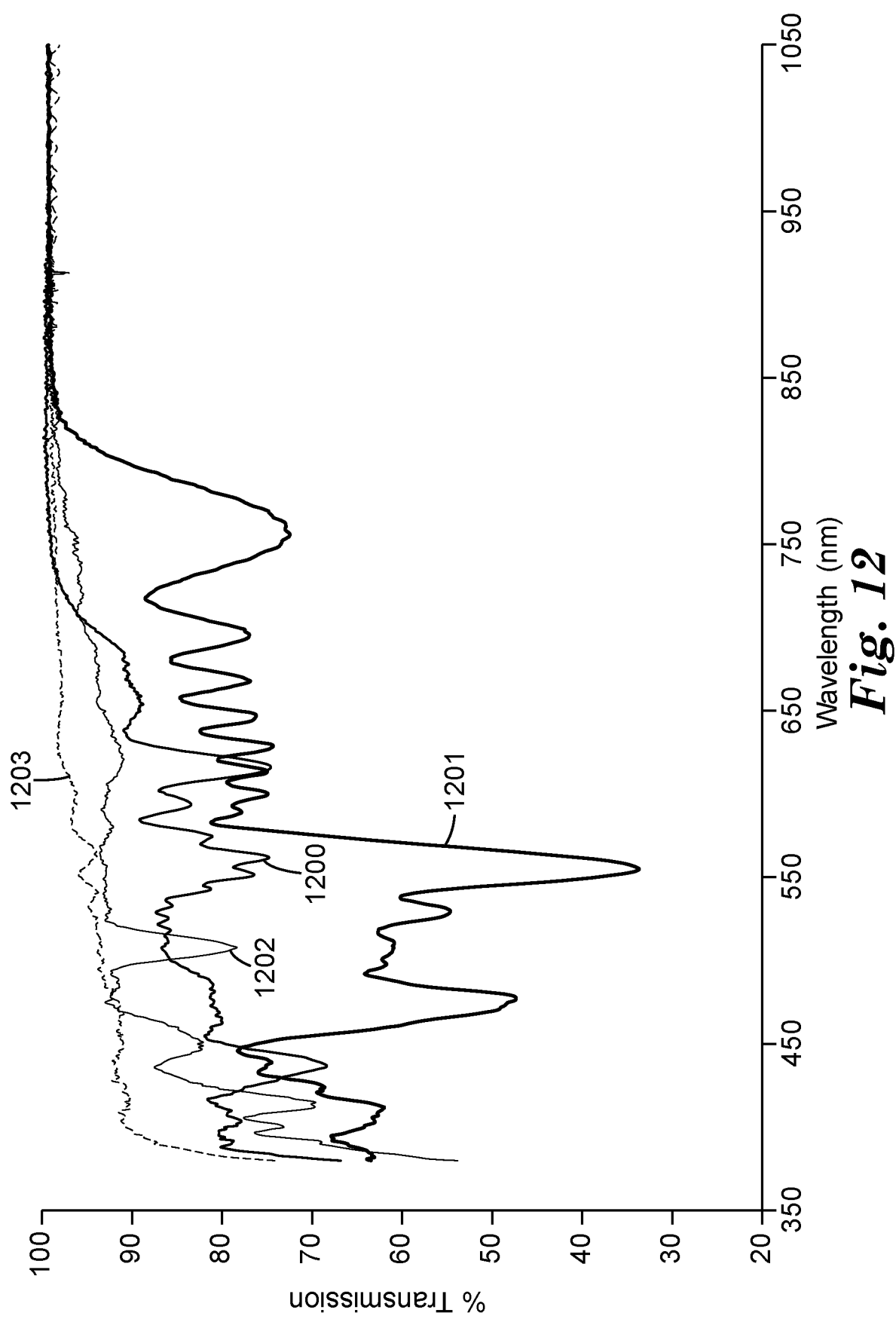
FIG. 12 is a graph similar to that of FIG. 11, for four reflective polarizer samples taken from a first edge portion of their respective film webs but otherwise corresponding respectively to the four reflective polarizer samples of FIG. 11.
Figure 13:
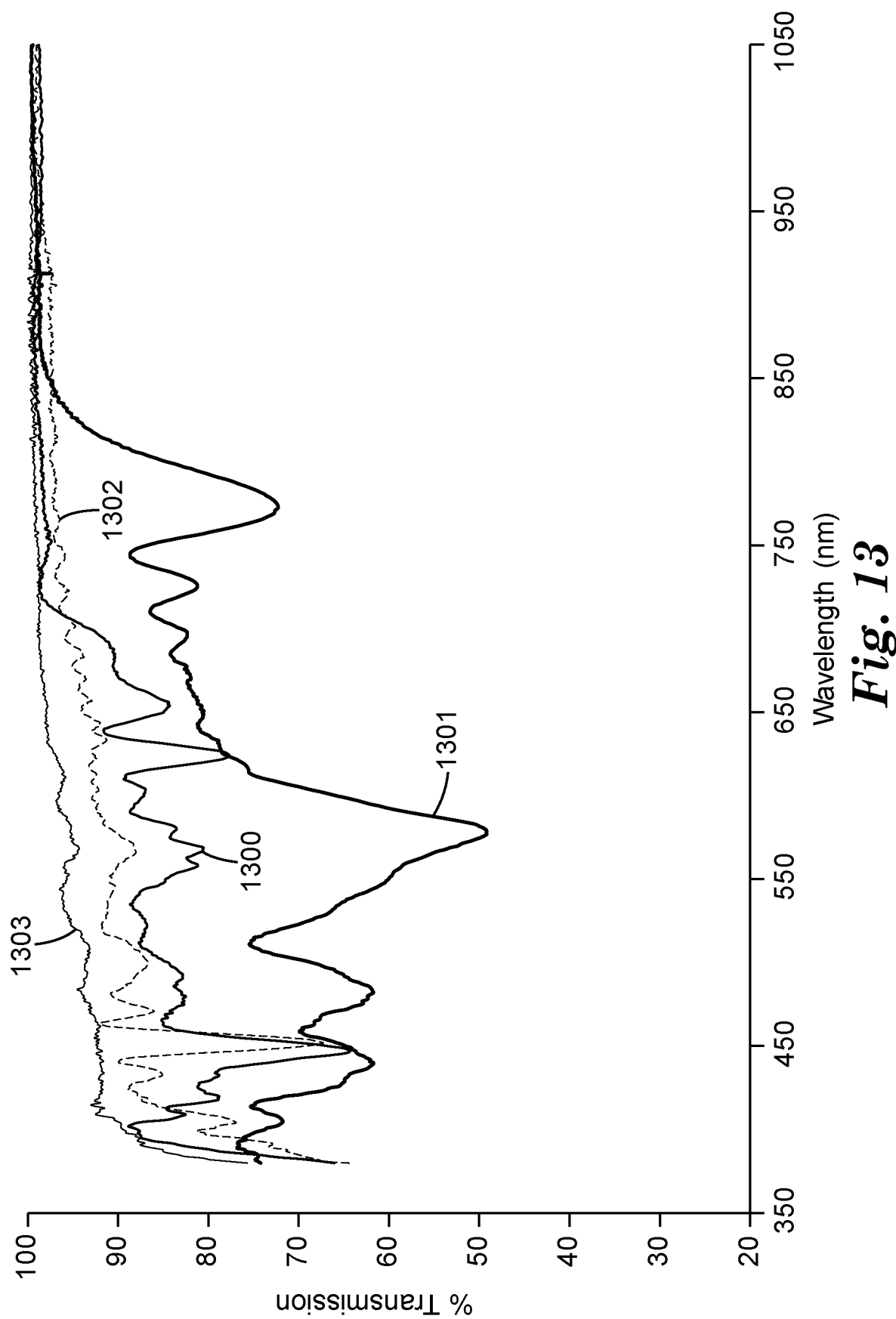
FIG. 13 is a graph similar to that of FIGS. 11 and 12, for four reflective polarizer samples taken from a second edge portion of their respective film webs but otherwise corresponding respectively to the four reflective polarizer samples of FIGS. 11 and 12.
Figure 14:
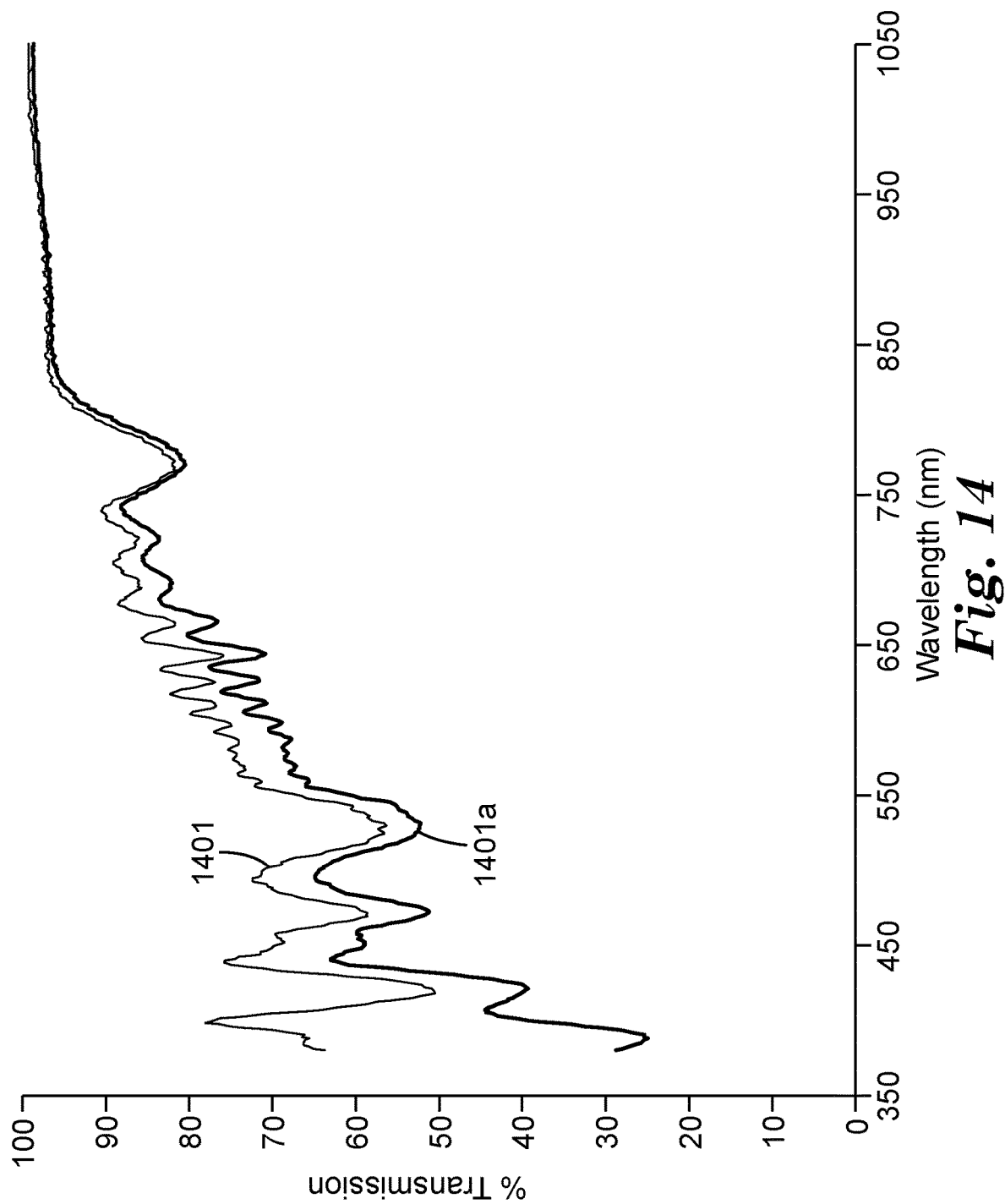
FIG. 14 is a graph of the spectral transmission for one of the reflective polarizer samples from FIG. 11, and the spectral transmission of that reflective polarizer sample laminated to an absorbing polarizer, in both cases for light incident at a 60 degree polar angle in a plane that includes the pass axis and the normal axis, the light being p-polarized in such plane of incidence.

A more difficult test of a reflective polarizer, in terms of its perceived color, is the appearance of the reflective polarizer at a significant oblique angle. At oblique observation angles, any refractive index difference between microlayers in the thickness direction (z-direction) becomes significant, and a shift in the transmission spectrum to shorter wavelengths also occurs. FIGS. 11, 12, and 13 show the measured transmission spectra for various samples of the four tested reflective polarizers under the following observation or illumination geometry: the spectral transmission of each sample was tested at a 60 degree polar angle, for light in a plane of incidence (reference plane) that contains the z-axis and the y-axis (pass axis) of the film, the light being polarized in such plane of incidence, i.e., p-polarized. (Furthermore, in each case the tested film was oriented such that the thick side of its microlayer packet(s) faced the light source of the spectrophotometer.) With this geometry, Fresnel reflections at the outer polymer/air interfaces of the film are small or negligible.

FIG. 11 shows the 60 degree p-pol transmission spectra as described above for each of the reflective polarizer film samples that were used in FIGS. 9 and 10, namely, film samples taken from the central portion of the respective film webs (see e.g. film sample 321c in FIG. 3). Thus, curve 1100 is for such a sample from the Example 1 reflective polarizer, curve 1101 is for such a sample from the Comparative Example 1 reflective polarizer, curve 1102 is for such a sample from the Comparative Example 2 reflective polarizer, and curve 1103 is for such a sample from the Comparative Example 3 reflective polarizer.

The Comparative Example 3 sample (curve 1103) shows very high transmission with a small amount of variation due to the layer-to-layer refractive index match in both the y- and z-directions (made possible by uniaxially birefringent microlayers), and the well-controlled layer thickness profile. The Example 1 sample (curve 1100) and the Comparative Example 2 sample (curve 1102) show a lower transmission throughout the visible region, which can be explained by the use of a standard tenter in the manufacture of these films, producing biaxial birefringence and a significant layer-to-layer refractive index difference in the z-direction. However, the relatively small spectral variability for the curves 1100 and 1102 is indicative of good layer thickness control and a well-tailored layer thickness profile of the microlayers and ORUs in the microlayer packet(s) of these samples. The Comparative Example 1 sample (curve 1101) has a lower average transmission because of the lower refractive index isotropic polymer used in the film than that of the other samples, but furthermore, the curve 1101 is quite variable in the visible wavelength region, which is indicative of a high perceived color.

The curve 1100 is in a range from 70% to 85% transmission for at least some wavelengths from 400 to 700 nm. The curve 1100 is also less than 90% throughout a wavelength range from 400 to 500 nm.

The high frequency variability $\Delta$ of the curves 1100 through 1103 was calculated, where a third order polynomial was in each case used as the best-fit curve, and where the calculation was performed over the wavelength range from 400 to 700 nm. The results are as follows: A for curves 1100, 1101, 1102, and 1103 was 0.0118, 0.0515, 0.0216, and 0.0043, respectively. These results are consistent with a visual observation of the film samples at the 60 degree geometry: the Comparative Example 3 sample exhibited the least amount of color, the Example 1 and Comparative Example 2 samples exhibited more color than Comparative Example 3 but still an amount of color that is acceptable in some display applications, and Comparative Example 1 exhibited the most color. Note that A for the Example 1 sample (curve 1100) is less than 0.08, and less than 0.05, but is at least 0.01.

To investigate the effect of spatial variability at different regions of the film web, measurements were also made on samples of the reflective polarizers taken from the edges of the respective film webs.

FIG. 12 is a graph of spectral transmission taken under the same measurement conditions as FIG. 11, but in FIG. 12 the film samples were taken from a first edge portion of the respective film webs, see e.g. film sample 321*a* in FIG. 3. Thus, curve 1200 is for such a sample from the Example 1 reflective polarizer, curve 1201 is for such a sample from the Comparative Example 1 reflective polarizer, curve 1202 is for such a sample from the Comparative Example 2 reflective polarizer, and curve 1203 is for such a sample from the Comparative Example 3 reflective polarizer.

FIG. 13 is a graph of spectral transmission taken under the same measurement conditions as FIGS. 11 and 12, but in FIG. 13 the film samples were taken from a second edge portion of the respective film webs, see e.g. film sample 321*b* in FIG. 3. Thus, curve 1300 is for such a sample from the Example 1 reflective polarizer, curve 1301 is for such a sample from the Comparative Example 1 reflective polarizer, curve 1302 is for such a sample from the Comparative Example 2 reflective polarizer, and curve 1303 is for such a sample from the Comparative Example 3 reflective polarizer.

The FIG. 12 and FIG. 13 graphs follow a trend similar to FIG. 11. Thus, for the samples taken from the edges of the film webs, Comparative Example 3 still exhibits the highest and smoothest transmission over visible wavelengths. Comparative Example 1 still exhibits the lowest average transmission and the most spectral variability, and hence color. And Example 1 and Comparative Example 2 still show an intermediate transmission, whose spectral variability in the visible region is greater than that of Comparative Example 3 but less than that of Comparative Example 1.

The high frequency variability $\Delta$ of the curves in FIGS. 12 and 13 was calculated in the same way as described above in connection with FIG. 11. The results are as follows: A for curves 1200, 1201, 1202, and 1203 was 0.0383, 0.0918, 0.0421, and 0.0049, respectively, and A for curves 1300, 1301, 1302, and 1303 was 0.0516, 0.0607, 0.0339, and 0.0059, respectively. These results are consistent with a visual observation of these edge-vicinity film samples at the 60 degree geometry: the Comparative Example 3 sample exhibited the least amount of color, the Example 1 and Comparative Example 2 samples exhibited more color than Comparative Example 3 but still an amount of color that is acceptable in some display applications, and Comparative Example 1 exhibited the most color.

Laminates of the various reflective polarizer films were also made by bonding the reflective polarizer to an absorbing polarizer using a transparent optical adhesive layer, e.g. as shown schematically in FIG. 7. The absorbing polarizer was HL C2-5618S from Sanritz Corporation of Tokyo, Japan. The optical adhesive was provided with the HL C2-5618S polarizer from Sanritz. There was no air gap between the absorbing polarizer and the reflective polarizer, and these polarizers were oriented such that their pass axes were substantially aligned, and such that their block axes were also substantially aligned. No light diffusing layer or structure was disposed between the reflective polarizer and the absorbing polarizer, and no light diffusing layer was included in the laminate at all. Such laminates were made both with reflective polarizer samples taken from the central portion of the reflective polarizer web, and samples taken from the edge portion of the web.

In these laminates, the absorbing polarizer had a relatively minor effect on the transmission spectrum that was observed with the reflective polarizer by itself, and a relatively minor effect on the variability of such spectrum. This is demonstrated in FIG. 14. There, curve 1401 is the transmission spectrum of a sample of the Comparative Example 1 reflective polarizer taken from a central portion of the film web, for p-polarized light incident in a plane that includes the z-axis and the y-axis (pass axis), at a 60 degree polar angle. A laminate as described in the preceding paragraph was made with this reflective polarizer and an absorbing polarizer. The transmission spectrum for such laminate was measured, and is shown as curve 1401*a*.

Visual inspection of the various laminates, including viewing the laminates in transmission for p-polarized light at a 60 degree polar angle in the y-z plane, yielded conclusions that were consistent with the observations of the reflective polarizer films themselves. In particular, with regard to laminates that used the Example 1 reflective polarizer, the laminates exhibited more color than laminates made with the Comparative Example 3 reflective polarizer, but the amount of color of such laminates was still at an acceptable level with regard to some display applications.

Second laminates were made that included not only the reflective polarizer and the absorbing polarizer, but also a glass layer, as depicted schematically in FIG. 8. In these second laminates, the glass layer was the back panel plate of a LC panel taken from an iPad4 device made by Apple Computer, Cupertino, Calif. Also, in these second laminates: there was no air gap between the absorbing polarizer and the reflective polarizer; the polarizers were oriented such that their pass axes were substantially aligned, and such that their block axes were also substantially aligned; no light diffusing layer or structure was disposed between the reflective polarizer and the absorbing polarizer, and no light diffusing layer was included in the laminate at all.

Visual inspection of the second laminates, including viewing the laminates in transmission for p-polarized light at a 60 degree polar angle in the y-z plane, and viewing the film in an operating iPad4 device with the entire display set to a white output color, yielded conclusions that were consistent with the observations of the reflective polarizer films themselves. In particular, with regard to second laminates that used the Example 1 reflective polarizer, the laminates exhibited more color than second laminates made with the Comparative Example 3 reflective polarizer, but the amount of color of such second laminates was still at an acceptable level with regard to some on-glass display applications.

Following is a non-comprehensive list of embodiments of the present disclosure.

Item 1 is a laminate, comprising:
- a reflective polarizer having only one packet of microlayers that reflects and transmits light by optical interference, the microlayers configured to define a first pass axis, a first block axis, and a first thickness axis perpendicular to the first pass axis and the first block axis; and
- an absorbing polarizer having a second pass axis and a second block axis, the absorbing polarizer attached to the reflective polarizer with no air gap therebetween and such that the first and second pass axes are substantially aligned;
- wherein the packet of microlayers includes alternating first and second microlayers, the first microlayers being biaxially birefringent;
- wherein the reflective polarizer in isolation is characterized by a spectral transmission, for p-polarized light incident at a polar angle of 60 degrees in a reference plane that includes the first pass axis and the first thickness axis, in which
  - (a) the spectral transmission has a value in a range from 70% to 90% for at least some wavelengths from 450 to 700 nm; and
  - (b) a high frequency spectral variability $\Delta$, over a wavelength range from 400 to 700 nm, is less than 0.08.

Item 2 is the laminate of item 1, wherein no light diffusing layer or structure is disposed between the reflective polarizer and the absorbing polarizer.

Item 3 is the laminate of item 1, wherein the laminate is devoid of any light diffusing layer or structure.

Item 4 is the laminate of item 1, further comprising a light diffusing layer or structure disposed between the reflective polarizer and the absorbing polarizer, the light diffusing layer or structure having a haze of less than 30%.

Item 5 is the laminate of item 1, wherein the laminate further comprises a glass layer, the absorbing polarizer disposed within the laminate between the reflective polarizer and the glass layer.

Item 6 is the laminate of item 5, wherein the glass layer is part of a liquid crystal display (LCD) panel.

Item 7 is the laminate of item 1, wherein the high frequency spectral variability $\Delta$ is a standard deviation of the spectral transmission relative to a best fit curve of the form $a_0 + a_1\lambda + a_2\lambda^2 + a_3\lambda^3$.

Item 8 is the laminate of item 1, wherein $\Delta$, over the wavelength range from 400 to 700 nm, is less than 0.05.

Item 9 is the laminate of item 8, wherein $\Delta$, over the wavelength range from 400 to 700 nm, is at least 0.01.

Item 10 is the laminate of item 1, wherein the spectral transmission, for p-polarized light incident in the reference plane at the 60 degree polar angle, is less than 90% throughout a wavelength range from 400 to 500 nm.

Item 11 is the laminate of item 1, wherein the reflective polarizer is a central portion of a reflective polarizer web.

Item 12 is the laminate of item 1, wherein the reflective polarizer is an edge portion of a reflective polarizer web.

Item 13 is the laminate of item 1, wherein at least some of the first microlayers have refractive indices nx, ny, nz along respectively the first block axis, the first pass axis, and the first thickness axis, and wherein |ny−nz|>0.05, and wherein |nx−ny|>0.08.

Item 14 is the laminate of item 1, wherein the reflective polarizer has a physical thickness of less than 50 microns.

Item 15 is the laminate of item 14, wherein the physical thickness of the reflective polarizer is in a range from 20 to 40 microns.

Item 16 is the laminate of item 1, wherein the laminate consists essentially of the reflective polarizer, the absorbing polarizer, and an adhesive layer that bonds the reflective polarizer to the absorbing polarizer.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. An optical laminate comprising an absorbing polarizer bonded to a reflective polarizer comprising a plurality of microlayers, such that for substantially normally incident light and for at least one wavelength in a first wavelength range from 450 nm to 700 nm, the plurality of microlayers substantially reflects the incident light polarized along a block axis and substantially transmits the incident light polarized along an orthogonal pass axis, wherein the optical laminate has an optical haze of less than 20% and for light incident at 60 degrees and linearly polarized in a plane of incidence of the incident light and over a second wavelength range from 400 nm to 700 nm, the plurality of microlayers has a high frequency spectral variability of less than 0.08.

2. The optical laminate of claim 1 having an optical haze of less than 10%.

3. The optical laminate of claim 1 having an optical haze of less than 5%.

4. A display comprising the optical laminate of claim 1 laminated to a liquid crystal panel.

5. The display of claim 4, wherein the absorbing polarizer is disposed between the liquid crystal panel and the reflective polarizer.

6. The display of claim 4, wherein an adhesive layer attaches the optical laminate to the liquid crystal panel.

7. The optical laminate of claim 1 transmitting between 70% and 90% for the incident light incident at 60 degrees and linearly polarized in the plane of incidence of the incident light and over the second wavelength range.

8. The optical laminate of claim 1, wherein the absorbing polarizer has a pass axis substantially aligned with the pass axis of the reflective polarizer.

9. The optical laminate of claim 1, wherein the high frequency spectral variability is a standard deviation of a spectral transmission of the plurality of microlayers relative to a best fit curve of the form $a_0+a_1\lambda+a_2\lambda^2+a_3\lambda^3$.

10. The optical laminate of claim 1, wherein the high frequency spectral variability is less than 0.05.

11. The optical laminate of claim 1, wherein the high frequency spectral variability is at least 0.01.

12. The optical laminate of claim 1 being devoid of any light diffusing layer or structure.

13. The optical laminate of claim 1, wherein the plurality of microlayers comprises a plurality of alternating first and second microlayers, the first microlayers being biaxially birefringent.

14. The optical laminate of claim 13, wherein at least some of the first microlayers have refractive indices nx, ny, nz along respectively the block axis, the pass axis, and a thickness axis orthogonal to the block and pass axes, and wherein $|ny-nz|>0.05$, and wherein $|nx-ny|>0.08$.

15. The optical laminate of claim 1, wherein the reflective polarizer has a physical thickness of less than 50 microns.

* * * * *